US012244067B2

(12) United States Patent
Zhang et al.

(10) Patent No.: US 12,244,067 B2
(45) Date of Patent: Mar. 4, 2025

(54) ANTENNA AND ELECTRONIC APPARATUS

(71) Applicants: Beijing BOE Technology Development Co., Ltd., Beijing (CN); BOE Technology Group Co., Ltd., Beijing (CN)

(72) Inventors: Dongdong Zhang, Beijing (CN); Feng Qu, Beijing (CN); Yali Wang, Beijing (CN); Yafei Zhang, Beijing (CN); Mengwen Jia, Beijing (CN); Guoqiang Tang, Beijing (CN); Xichao Fan, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/907,492

(22) PCT Filed: Dec. 30, 2021

(86) PCT No.: PCT/CN2021/143049
§ 371 (c)(1),
(2) Date: Sep. 27, 2022

(87) PCT Pub. No.: WO2023/123200
PCT Pub. Date: Jul. 6, 2023

(65) Prior Publication Data
US 2024/0258713 A1 Aug. 1, 2024

(51) Int. Cl.
*H01Q 21/08* (2006.01)
*H01Q 1/38* (2006.01)
*H01Q 9/04* (2006.01)

(52) U.S. Cl.
CPC ............... *H01Q 21/08* (2013.01); *H01Q 1/38* (2013.01); *H01Q 9/0457* (2013.01)

(58) Field of Classification Search
None
See application file for complete search history.

(56) References Cited

U.S. PATENT DOCUMENTS 4,843,400 A 6/1989 Tsao et al.
4,847,625 A 7/1989 Dietrich et al.
(Continued)

FOREIGN PATENT DOCUMENTS

CN 106374228 A 2/2017
CN 110197947 A 9/2019
(Continued)

OTHER PUBLICATIONS

International Search Report & Written Opinion mailed Sep. 21, 2022, regarding PCT/CN2021/143049/.

*Primary Examiner* — Wilson Lee
(74) *Attorney, Agent, or Firm* — Intellectual Valley Law, P.C.

(57) ABSTRACT

An antenna is provided. The antenna includes a microstrip feed line, a ground plate, a slot extending through the ground plate, and a radiating plate. The radiating plate is on a side of the ground plate and the slot away from the microstrip feed line. The radiating plate is configured to receive a signal from the microstrip feed line by aperture coupling through the slot. The radiating plate includes a plurality of radiating blocks spaced apart from each other.

15 Claims, 60 Drawing Sheets

(56) References Cited

U.S. PATENT DOCUMENTS

| | | | | |
|---|---|---|---|---|
| 11,223,112 | B2 * | 1/2022 | Kona ..................... | H01Q 21/08 |
| 11,791,544 | B2 * | 10/2023 | Rogers ..................... | H01Q 1/38 343/702 |
| 2019/0379132 | A1 * | 12/2019 | Pelletti ................. | H01Q 9/0457 |
| 2020/0194901 | A1 * | 6/2020 | Lynch .................. | H01Q 13/206 |
| 2021/0313703 | A1 | 10/2021 | Stanley et al. | |
| 2022/0006486 | A1 * | 1/2022 | Rajagopalan .......... | H01Q 13/24 |
| 2023/0178896 | A1 * | 6/2023 | Nardini .................... | H01Q 3/34 343/711 |

FOREIGN PATENT DOCUMENTS

| | | | |
|---|---|---|---|
| CN | 110970722 | A | 4/2020 |
| CN | 112787099 | A | 5/2021 |
| CN | 112952372 | A | 6/2021 |
| CN | 113270716 | A | 8/2021 |
| CN | 113629398 | A | 11/2021 |
| JP | H0697724 | A | 4/1994 |

* cited by examiner

ANTENNA AND ELECTRONIC APPARATUS

CROSS-REFERENCE TO RELATED APPLICATION

This application is a national stage application under 35 U.S.C. § 371 of International Application No. PCT/CN2021/143049, filed Dec. 30, 2021, the contents of which are incorporated by reference in the entirety.

TECHNICAL FIELD

The present invention relates to an antenna and an electronic apparatus.

BACKGROUND

Millimeter wave antenna has been developed for the fifth generation (5G) mobile communication. For example, small cell base station technology has been developed to provide a solution to 5G communication coverage issue. Similarly, customer premise equipment technology has been developed to receive signals via millimeter wave. In these technologies, antenna, particularly millimeter wave antenna, plays a critical role.

SUMMARY

In a first aspect of the present disclosure, an antenna is provided, comprising a microstrip feed line, a ground plate, a slot extending through the ground plate, and a radiating plate; wherein the radiating plate is on a side of the ground plate and the slot away from the microstrip feed line; the radiating plate is configured to receive a signal from the microstrip feed line by aperture coupling through the slot; and the radiating plate comprises a plurality of radiating blocks spaced apart from each other.

In an embodiment of the present disclosure, the plurality of radiating blocks are spaced apart by a plurality of first slits and a plurality of second slits; a respective one of the plurality of first slits extend substantially along a first direction; and a respective one of the plurality of second slits extend substantially along a second direction, the second direction being different from the first direction.

In an embodiment of the present disclosure, the slot has a strip shape, a longitudinal direction of the slot has a first included angle with respect to the first direction, and a second included angle with respect to the second direction.

In an embodiment of the present disclosure, the first included angle is in a range of 40 degrees to 50 degrees; and the second included angle is in a range of 130 degrees to 140 degrees.

In an embodiment of the present disclosure, the first included angle is in a range of −5 degrees to 5 degrees; and the second included angle is in a range of 85 degrees to 95 degrees.

In an embodiment of the present disclosure, the plurality of first slits are equispaced, and the plurality of second slits are equispaced.

In an embodiment of the present disclosure, inter-slit distances of the plurality of first slits are substantially the same as inter-slit distances of the plurality of second slits.

In an embodiment of the present disclosure, inter-slit distances of the plurality of first slits are different from inter-slit distances of the plurality of second slits.

In an embodiment of the present disclosure, a combination of the plurality of radiating blocks has an overall circular shape.

In an embodiment of the present disclosure, a combination of the plurality of radiating blocks has an overall rectangular or square shape.

In an embodiment of the present disclosure, a combination of the plurality of radiating blocks has an overall cross shape.

In an embodiment of the present disclosure, the antenna comprises: a first conductive layer; a first dielectric layer on the first conductive layer; a second conductive layer on a side of the first dielectric layer away from the first conductive layer; a second dielectric layer on a side of the second conductive layer away from the first dielectric layer; and a third conductive layer on a side of the second dielectric layer away from the second conductive layer.

In an embodiment of the present disclosure, the first conductive layer comprises the microstrip feed line; the second conductive layer comprises the ground plate; and the third conductive layer comprises the radiating plate.

In an embodiment of the present disclosure, an orthographic projection of the ground plate on the first dielectric layer covers an orthographic projection of the radiating plate on the first dielectric layer except for in a region corresponding to the slot.

In an embodiment of the present disclosure, an orthographic projection of the microstrip feed line on the first dielectric layer at least partially overlaps with an orthographic projection of the slot on the first dielectric layer.

In a second aspect of the present disclosure, an antenna is provided, comprising a microstrip feed line, a ground plate, a slot extending through the ground plate, and a radiating plate; wherein the radiating plate is on a side of the ground plate and the slot away from the microstrip feed line; the radiating plate is configured to receive a signal from the microstrip feed line by aperture coupling through the slot; and the radiating plate has an overall polygonal shape having a plurality of sides; the plurality of sides comprises first sides extending along a first direction and second sides extending along a second direction; the slot has a strip shape, a longitudinal direction of the slot has a first included angle with respect to the first direction, and a second included angle with respect to the second direction, the second direction being different from the first direction; the first included angle is in a range of 40 degrees to 50 degrees; and the second included angle is in a range of 130 degrees to 140 degrees.

In an embodiment of the present disclosure, the radiating plate comprises a plurality of radiating blocks spaced apart from each other.

In an embodiment of the present disclosure, the plurality of radiating blocks are spaced apart by a plurality of first slits and a plurality of second slits; a respective one of the plurality of first slits extend substantially along the first direction; and a respective one of the plurality of second slits extend substantially along the second direction.

In an embodiment of the present disclosure, the radiating plate is a unitary structure.

In a third aspect of the present disclosure, an electronic apparatus is provided, comprising the above antenna.

BRIEF DESCRIPTION OF THE FIGURES

The following drawings are merely examples for illustrative purposes according to various disclosed embodiments and are not intended to limit the scope of the present invention.

FIG. 32 is a cross-sectional view along a K-K' line in FIG. 31A.

FIG. 33A illustrates an S11 graph of the antenna depicted in FIG. 31A.

FIG. 33B illustrates a realized gain curve of the antenna depicted in FIG. 31A at a central frequency point.

FIG. 33C illustrates a realized gain curve of the antenna depicted in FIG. 31A in a frequency range of 24 GHz to 30 GHz.

FIG. 34A is a plan view of an antenna in some embodiments according to the present disclosure.

FIG. 34B illustrates the structure of a first conductive layer in an antenna depicted in FIG. 34A.

FIG. 34C illustrates the structure of a first dielectric layer in an antenna depicted in FIG. 34A.

FIG. 34D illustrates the structure of a second conductive layer in an antenna depicted in FIG. 34A.

FIG. 34E illustrates the structure of a second dielectric layer in an antenna depicted in FIG. 34A.

FIG. 34F illustrates the structure of a third conductive layer in an antenna depicted in FIG. 34A.

FIG. 35A is a cross-sectional view along a L-L' line in FIG. 34A.

FIG. 35B illustrates included angles between a longitudinal direction of a slot and extension directions of slits in some embodiments according to the present disclosure.

Figure 34A:
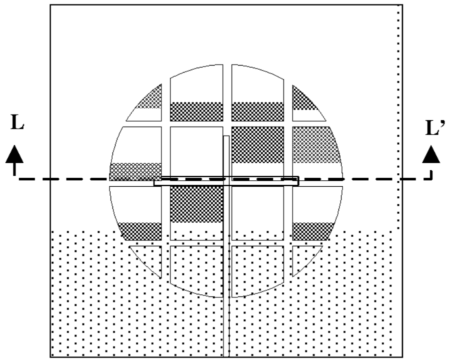
Figure 36A:
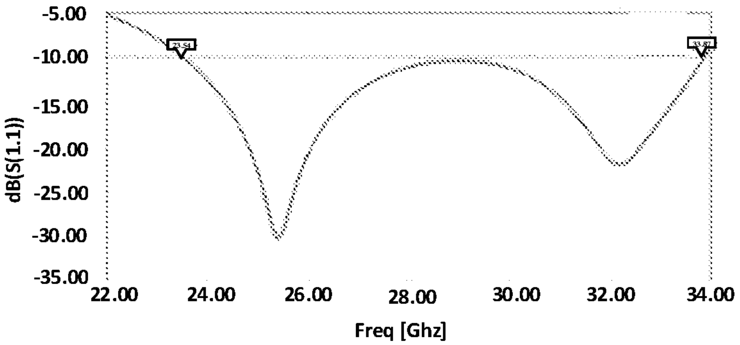

FIG. 36A illustrates an S11 graph of the antenna depicted in FIG. 34A.

Figure 36B:
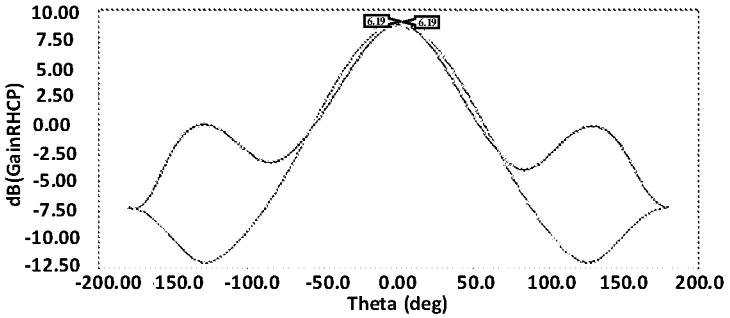

FIG. 36B illustrates a realized gain curve of the antenna depicted in FIG. 34A at a central frequency point.

Figure 36C:
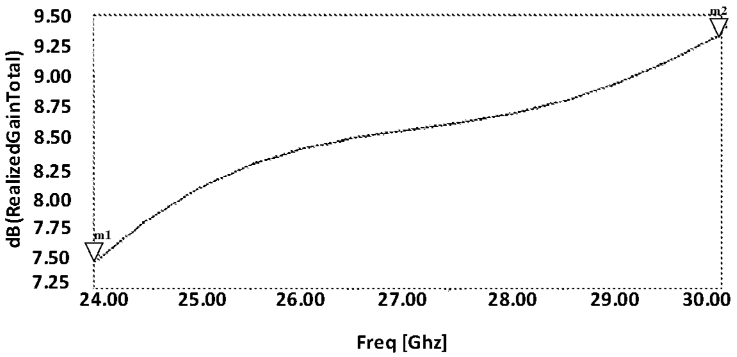

FIG. 36C illustrates a realized gain curve of the antenna depicted in FIG. 34A in a frequency range of 24 GHz to 30 GHz.

Figure 37A:
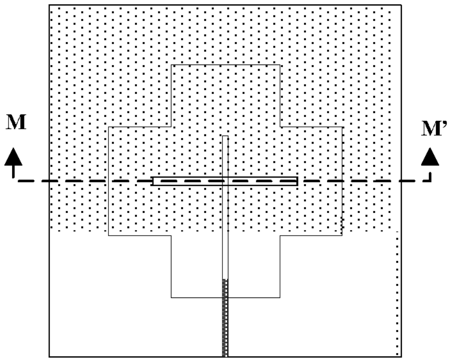

FIG. 37A is a plan view of an antenna in some embodiments according to the present disclosure.

Figure 37B:
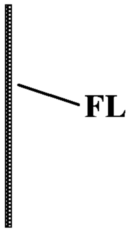

FIG. 37B illustrates the structure of a first conductive layer in an antenna depicted in FIG. 37A.

Figure 37C:
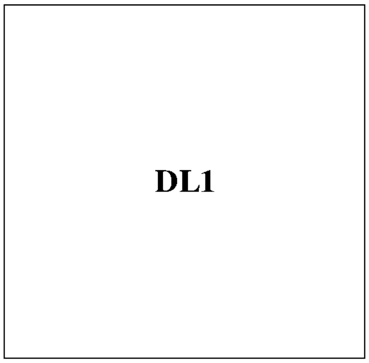

FIG. 37C illustrates the structure of a first dielectric layer in an antenna depicted in FIG. 37A.

Figure 37D:
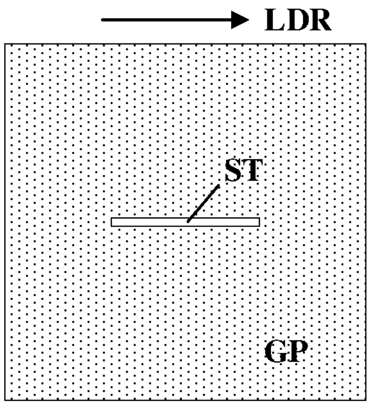

FIG. 37D illustrates the structure of a second conductive layer in an antenna depicted in FIG. 37A.

Figure 37E:
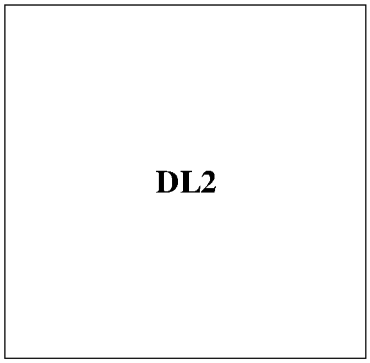

FIG. 37E illustrates the structure of a second dielectric layer in an antenna depicted in FIG. 37A.

Figure 37F:
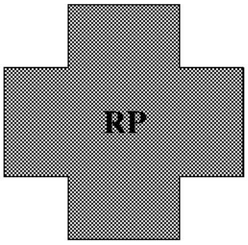

FIG. 37F illustrates the structure of a third conductive layer in an antenna depicted in FIG. 37A.

Figure 38:
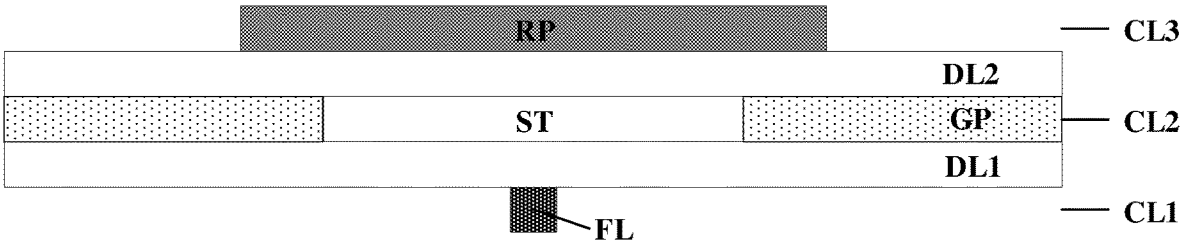

FIG. 38 is a cross-sectional view along a M-M' line in FIG. 37A.

Figure 39A:
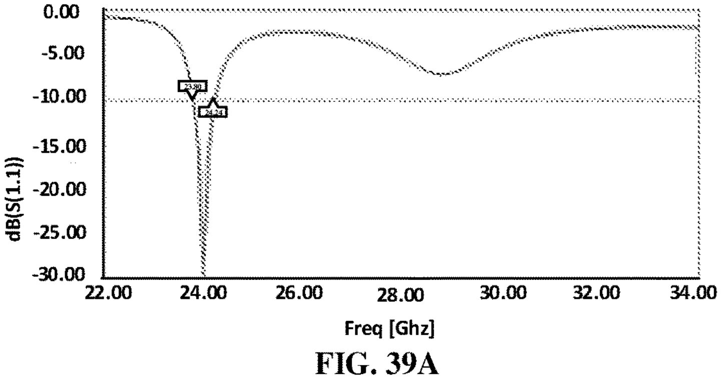

FIG. 39A illustrates an S11 graph of the antenna depicted in FIG. 37A.

Figure 39B:
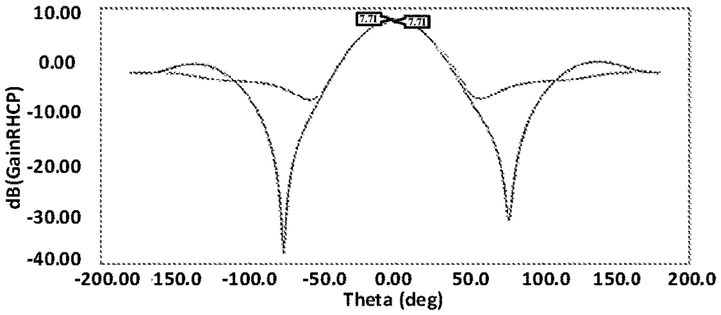

FIG. 39B illustrates a realized gain curve of the antenna depicted in FIG. 37A at a central frequency point.

Figure 39C:
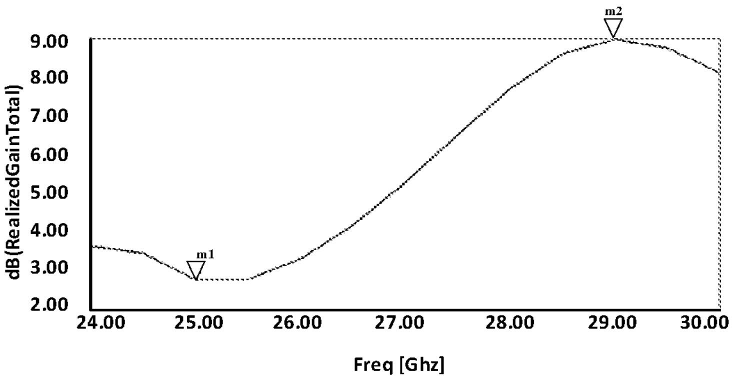

FIG. 39C illustrates a realized gain curve of the antenna depicted in FIG. 37A in a frequency range of 24 GHz to 30 GHz.

Figure 40A:
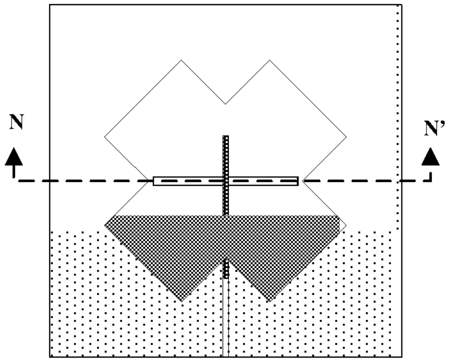

FIG. 40A is a plan view of an antenna in some embodiments according to the present disclosure.

Figure 40B:
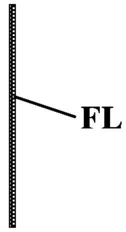

FIG. 40B illustrates the structure of a first conductive layer in an antenna depicted in FIG. 40A.

Figure 40C:
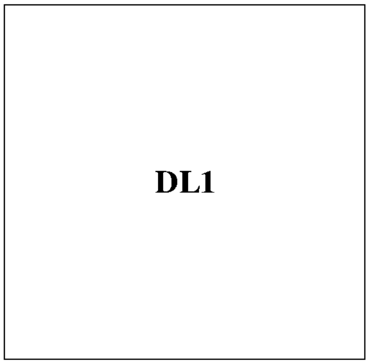

FIG. 40C illustrates the structure of a first dielectric layer in an antenna depicted in FIG. 40A.

Figure 40D:
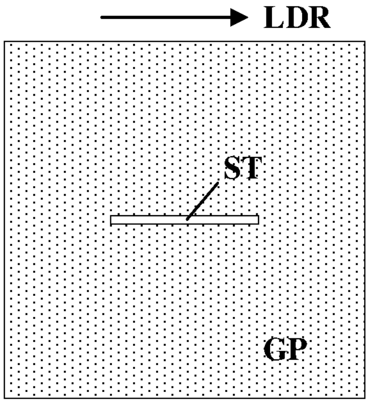

FIG. 40D illustrates the structure of a second conductive layer in an antenna depicted in FIG. 40A.

Figure 40E:
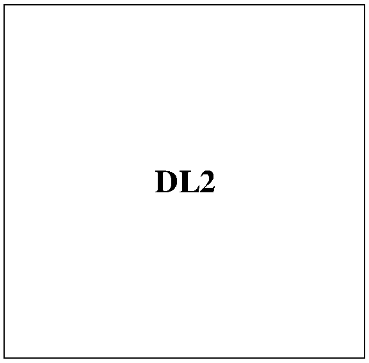

FIG. 40E illustrates the structure of a second dielectric layer in an antenna depicted in FIG. 40A.

Figure 40F:
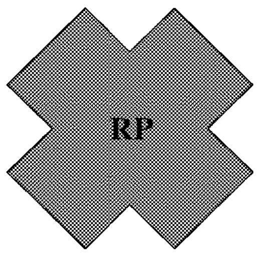

FIG. 40F illustrates the structure of a third conductive layer in an antenna depicted in FIG. 40A.

Figure 41A:
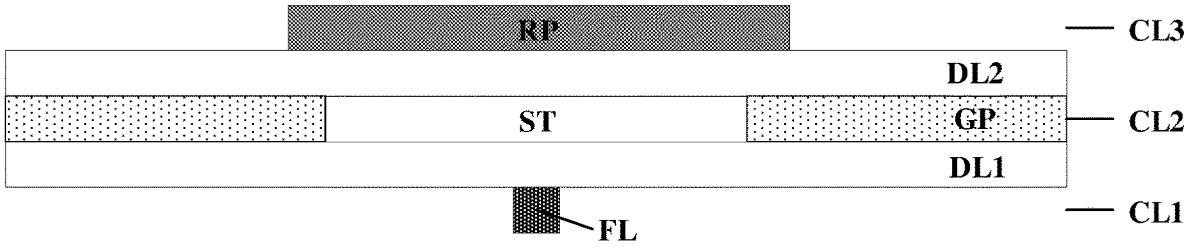

FIG. 41A is a cross-sectional view along an N-N' line in FIG. 40A.

Figure 41B:
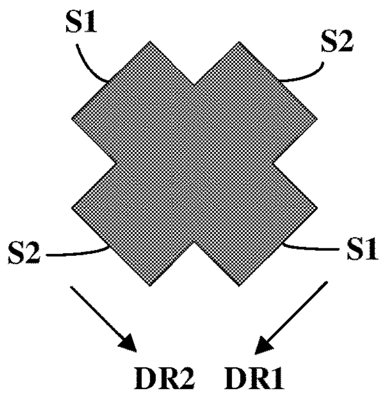

FIG. 41B illustrates an overall shape of a radiating plate of the antenna depicted in FIG. 40A.

Figure 41C:
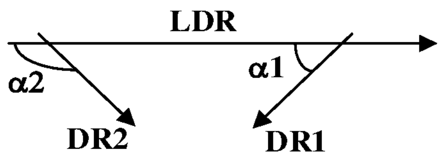

FIG. 41C illustrates included angles between a longitudinal direction of a slot and extension directions of first sides and second sides of an overall shape of a radiating plate in some embodiments according to the present disclosure.

Figure 42A:
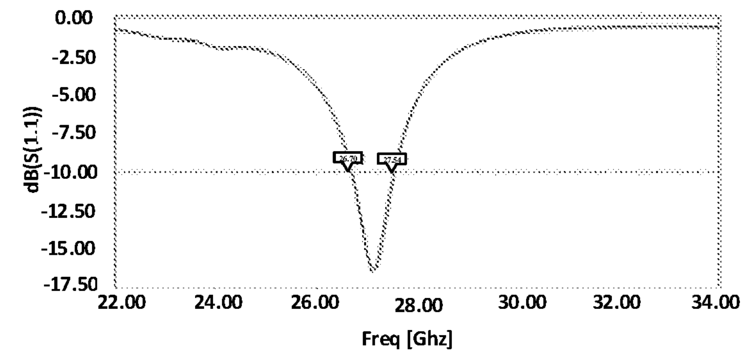

FIG. 42A illustrates an S11 graph of the antenna depicted in FIG. 40A.

Figure 42B:
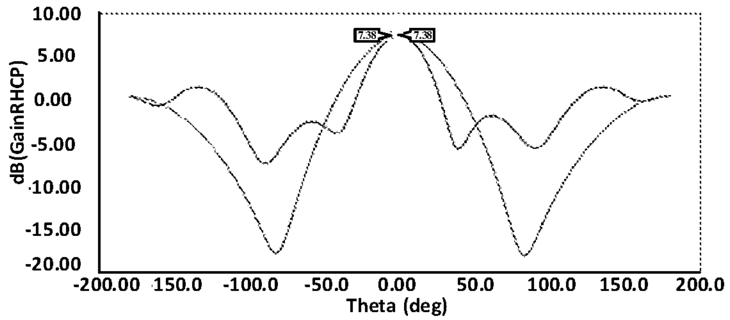

FIG. 42B illustrates a realized gain curve of the antenna depicted in FIG. 40A at a central frequency point.

Figure 42C:
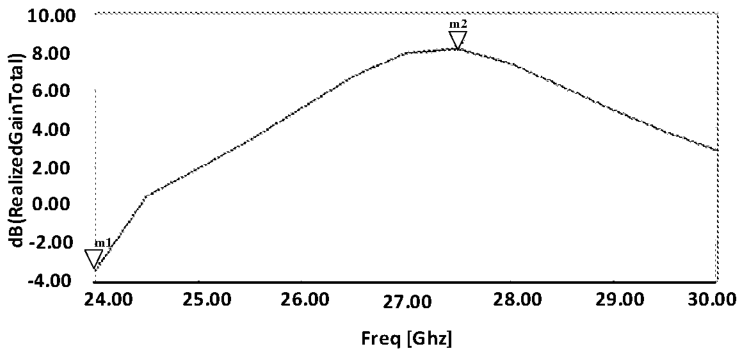

FIG. 42C illustrates a realized gain curve of the antenna depicted in FIG. 40A in a frequency range of 24 GHz to 30 GHz.

Figure 43A:
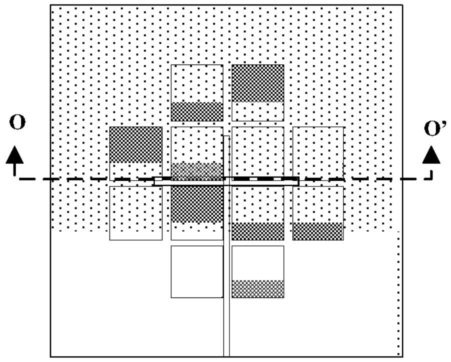

FIG. 43A is a plan view of an antenna in some embodiments according to the present disclosure.

Figure 43B:
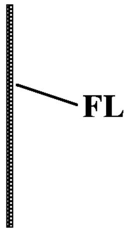

FIG. 43B illustrates the structure of a first conductive layer in an antenna depicted in FIG. 43A.

Figure 43C:
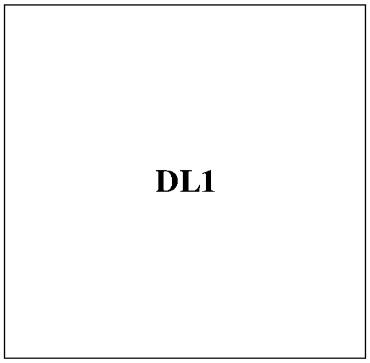

FIG. 43C illustrates the structure of a first dielectric layer in an antenna depicted in FIG. 43A.

Figure 43D:
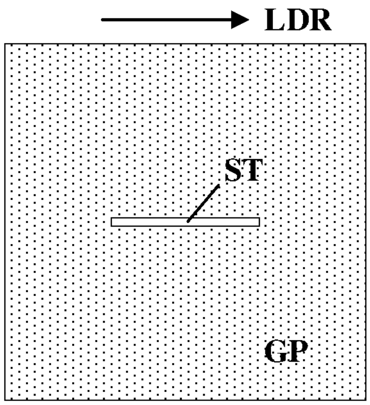

FIG. 43D illustrates the structure of a second conductive layer in an antenna depicted in FIG. 43A.

Figure 43E:
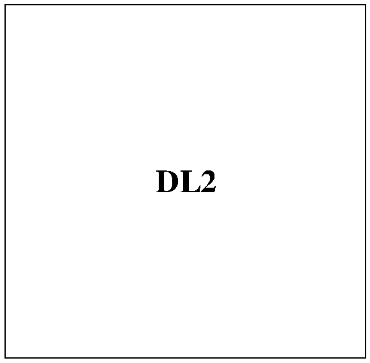

FIG. 43E illustrates the structure of a second dielectric layer in an antenna depicted in FIG. 43A.

Figure 43F:
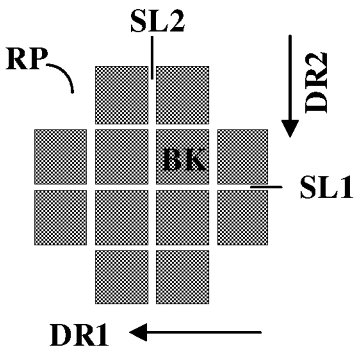

FIG. 43F illustrates the structure of a third conductive layer in an antenna depicted in FIG. 43A.

Figure 44A:
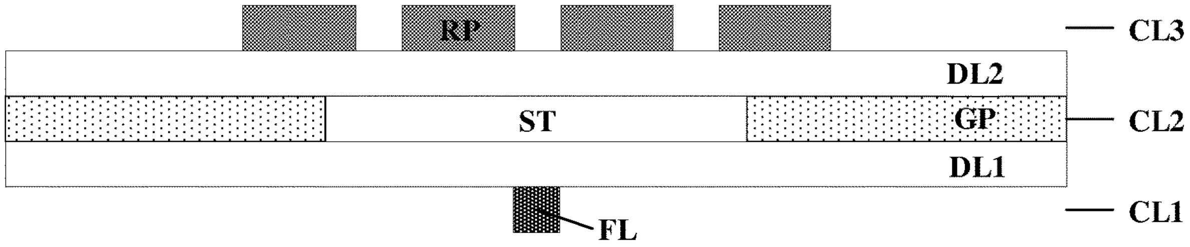

FIG. 44A is a cross-sectional view along an O-O' line in FIG. 43A.

Figure 44B:
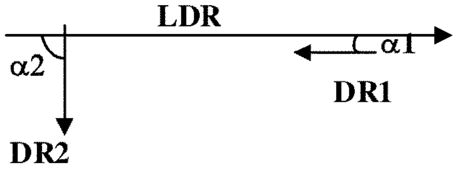

FIG. 44B illustrates included angles between a longitudinal direction of a slot and extension directions of slits in some embodiments according to the present disclosure.

Figure 44C:
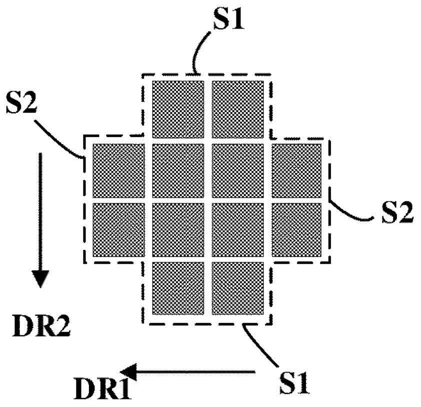

FIG. 44C illustrates an overall shape of a radiating plate of the antenna depicted in FIG. 43A.

Figure 45A:
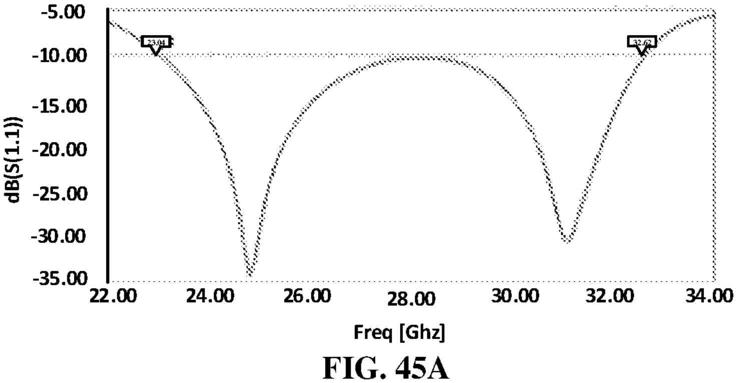

FIG. 45A illustrates an S11 graph of the antenna depicted in FIG. 43A.

Figure 45B:
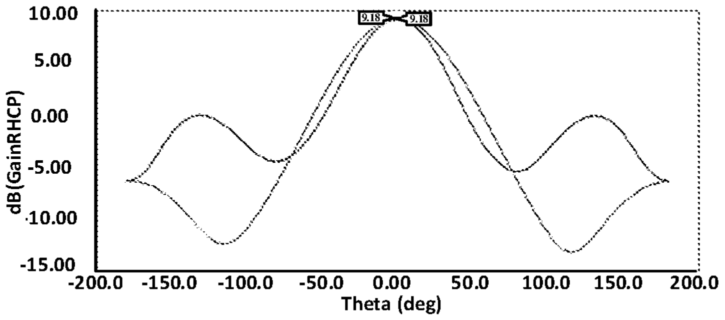

FIG. 45B illustrates a realized gain curve of the antenna depicted in FIG. 43A at a central frequency point.

Figure 45C:
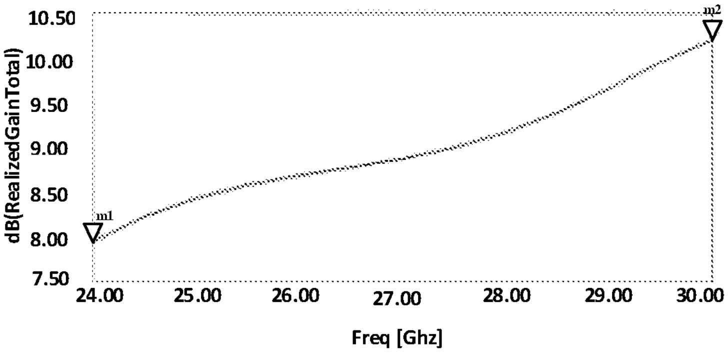

FIG. 45C illustrates a realized gain curve of the antenna depicted in FIG. 43A in a frequency range of 24 GHz to 30 GHz.

Figure 46A:
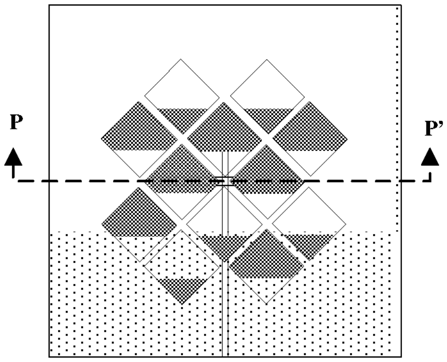

FIG. 46A is a plan view of an antenna in some embodiments according to the present disclosure.

Figure 46B:
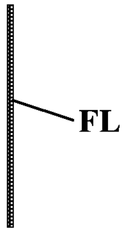

FIG. 46B illustrates the structure of a first conductive layer in an antenna depicted in FIG. 46A.

Figure 46C:
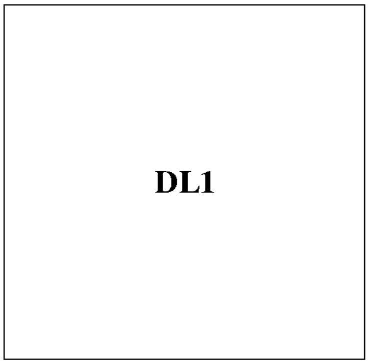

FIG. 46C illustrates the structure of a first dielectric layer in an antenna depicted in FIG. 46A.

Figure 46D:
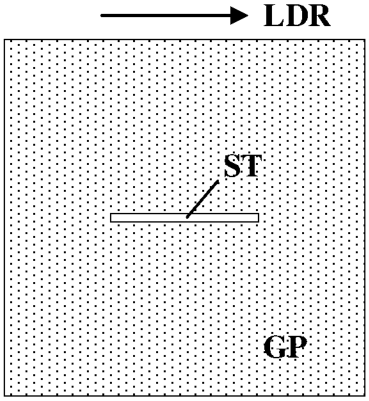

FIG. 46D illustrates the structure of a second conductive layer in an antenna depicted in FIG. 46A.

Figure 46E:
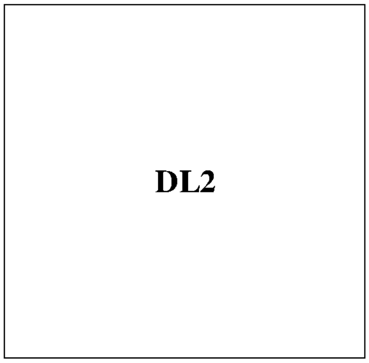

FIG. 46E illustrates the structure of a second dielectric layer in an antenna depicted in FIG. 46A.

Figure 46F:
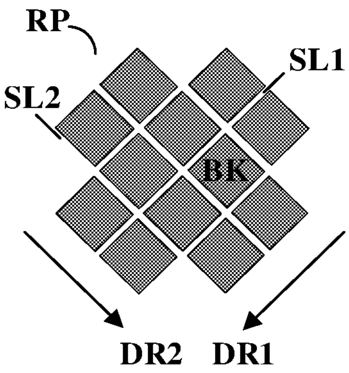

FIG. 46F illustrates the structure of a third conductive layer in an antenna depicted in FIG. 46A.

Figure 47A:
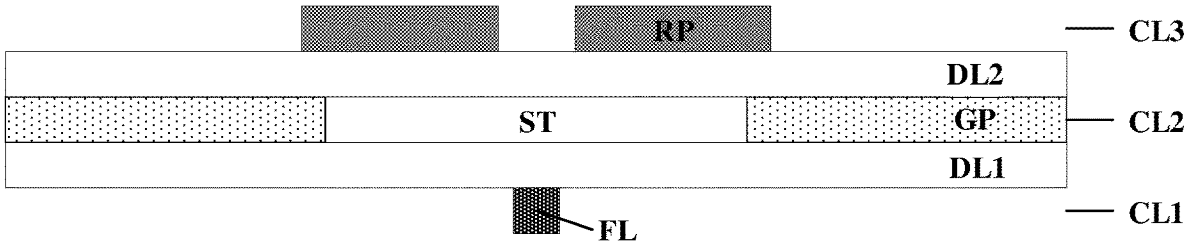

FIG. 47A is a cross-sectional view along a P-P' line in FIG. 46A.

Figure 47B:
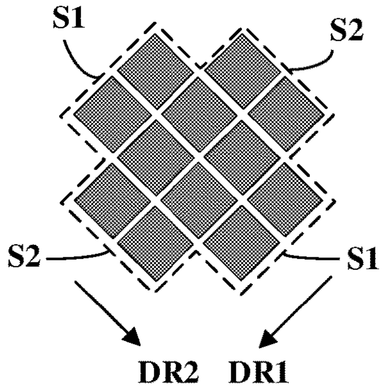

FIG. 47B illustrates included angles between a longitudinal direction of a slot and extension directions of slits in some embodiments according to the present disclosure.

Figure 47C:
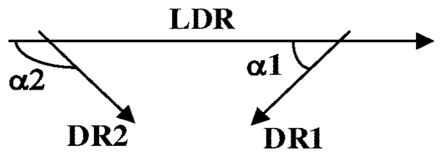

FIG. 47C illustrates an overall shape of a radiating plate of the antenna depicted in FIG. 46A.

Figure 48A:
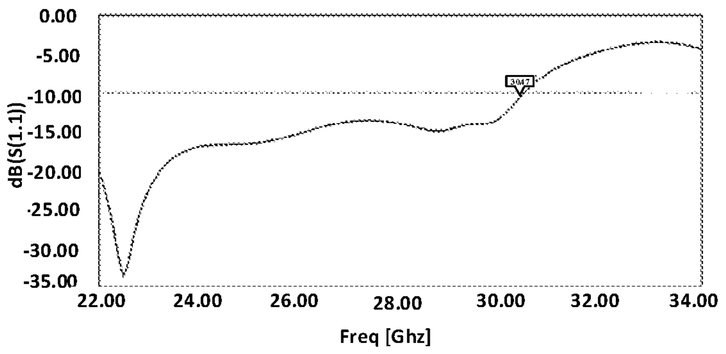

FIG. 48A illustrates an S11 graph of the antenna depicted in FIG. 46A.

Figure 48B:
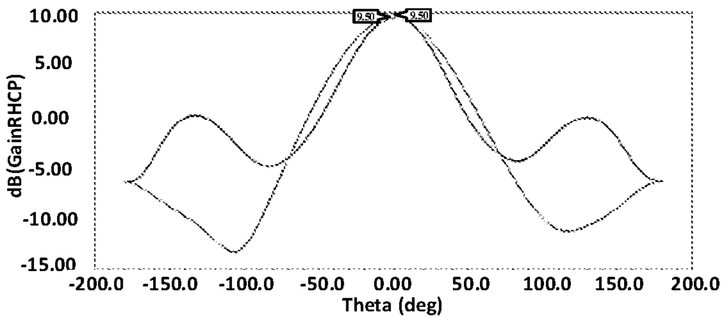

FIG. 48B illustrates a realized gain curve of the antenna depicted in FIG. 46A at a central frequency point.

Figure 48C:
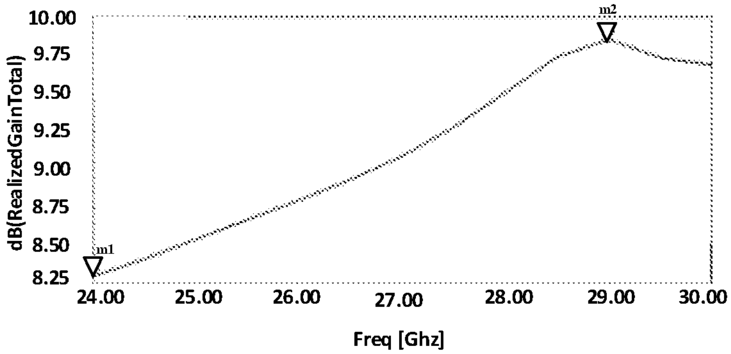

FIG. 48C illustrates a realized gain curve of the antenna depicted in FIG. 46A in a frequency range of 24 GHz to 30 GHz.

Figure 49:
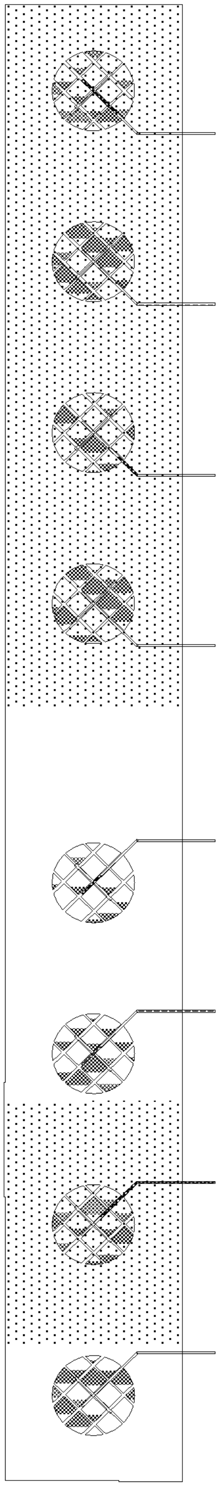

FIG. 49 illustrates an antenna array comprising a plurality of antenna described in the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an antenna and an electronic apparatus that substantially obviate one or more of the problems due to limitations and disadvantages of the related art. In one aspect, the present disclosure provides an antenna. In some embodiments, the antenna includes a microstrip feed line, a ground plate, a slot extending through the ground plate, and a radiating plate. Optionally, the radiating plate is on a side of the ground plate and the slot away from the microstrip feed line. Optionally, the radiating plate is configured to receive a signal from the microstrip feed line by aperture coupling through the slot. Optionally, the radiating plate comprises a plurality of radiating blocks spaced apart from each other.

Figure 1A:
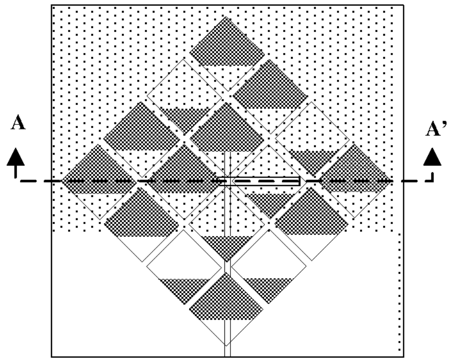
FIG. 1A is a plan view of an antenna in some embodiments according to the present disclosure.
Figure 1B:
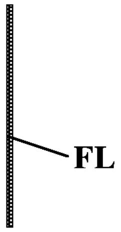
FIG. 1B illustrates the structure of a first conductive layer in an antenna depicted in FIG. 1A.
Figure 1C:
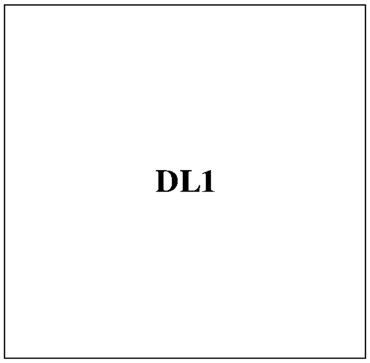
FIG. 1C illustrates the structure of a first dielectric layer in an antenna depicted in FIG. 1A.
Figure 1D:
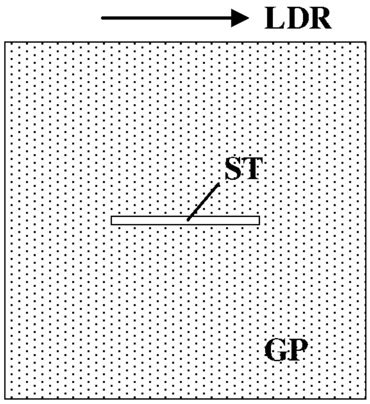
FIG. 1D illustrates the structure of a second conductive layer in an antenna depicted in FIG. 1A.
Figure 1E:
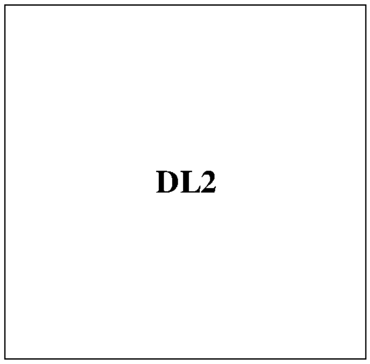
FIG. 1E illustrates the structure of a second dielectric layer in an antenna depicted in FIG. 1A.
Figure 1F:
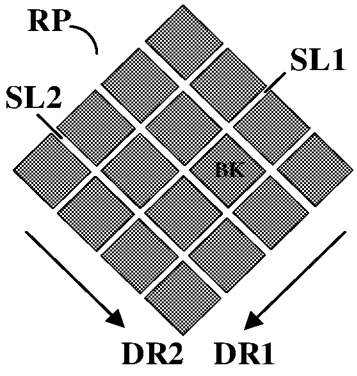
FIG. 1F illustrates the structure of a third conductive layer in an antenna depicted in FIG. 1A.
Figure 2A:
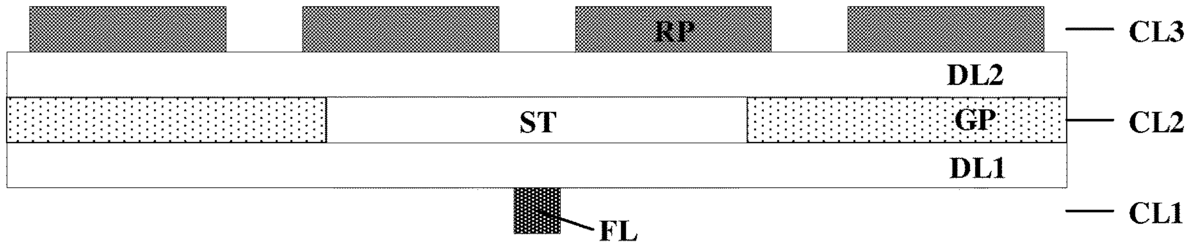
FIG. 2A is a cross-sectional view along an A-A' line in FIG. 1A.

FIG. 1A is a plan view of an antenna in some embodiments according to the present disclosure. FIG. 1B illustrates the structure of a first conductive layer in an antenna depicted in FIG. 1A. FIG. 1C illustrates the structure of a first dielectric layer in an antenna depicted in FIG. 1A. FIG. 1D illustrates the structure of a second conductive layer in an antenna depicted in FIG. 1A. FIG. 1E illustrates the structure of a second dielectric layer in an antenna depicted in FIG. 1A. FIG. 1F illustrates the structure of a third conductive layer in an antenna depicted in FIG. 1A. FIG. 2A is a cross-sectional view along an A-A' line in FIG. 1A. Referring to FIG. 1A to FIG. 1F, and FIG. 2A, the antenna includes a microstrip feed line FL, a ground plate GP, a slot ST extending through the ground plate GP, and a radiating plate RP. The radiating plate RP is on a side of the ground plate GP and the slot ST away from the microstrip feed line FL.

In some embodiments, the antenna includes a first conductive layer CL1; a first dielectric layer DL1 on the first conductive layer CL1; a second conductive layer CL2 on a side of the first dielectric layer DL1 away from the first conductive layer CL1; a second dielectric layer DL2 on a side of the second conductive layer CL2 away from the first dielectric layer DL1; and a third conductive layer CL3 on a side of the second dielectric layer DL2 away from the second conductive layer CL2.

In some embodiments, the first conductive layer CL1 includes the microstrip feed line FL; the second conductive layer CL2 includes the ground plate GP; and the third conductive layer CL3 includes the radiating plate RP.

In some embodiments, an orthographic projection of the first dielectric layer DL1 on the second dielectric layer DL2 at least partially overlaps with an orthographic projection of the slot ST on the second dielectric layer DL2. Optionally, the orthographic projection of the first dielectric layer DL1 on the second dielectric layer DL2 covers the orthographic projection of the slot ST on the second dielectric layer DL2. In some embodiments, an orthographic projection of the second dielectric layer DL2 on the first dielectric layer DL1 at least partially overlaps with an orthographic projection of the slot ST on the first dielectric layer DL1. Optionally, the orthographic projection of the second dielectric layer DL2 on the first dielectric layer DL1 covers the orthographic projection of the slot ST on the first dielectric layer DL1. The radiating plate RP is configured to receive a signal from the microstrip feed line FL by aperture coupling through the slot ST. For example, the radiating patch RP is activated by the microstrip feed line FL through aperture coupling.

In some embodiments, an orthographic projection of the ground plate GP and the slot ST on the first dielectric layer DL1 covers an orthographic projection of the radiating plate RP on the first dielectric layer. In some embodiments, an orthographic projection of the ground plate GP on the first dielectric layer DL1 covers an orthographic projection of the radiating plate RP on the first dielectric layer DL1 except for in a region corresponding to the slot ST.

In some embodiments, an orthographic projection of the microstrip feed line FL on the first dielectric layer DL1 at least partially overlaps with an orthographic projection of the slot ST on the first dielectric layer DL1. In one example, the microstrip feed line FL crosses over the slot ST.

In some embodiments, the radiating plate RP includes a plurality of radiating blocks BK spaced apart from each other. The plurality of radiating blocks BK are electrically isolated from each other, each of which is activated by the microstrip feed line FL through aperture coupling. As discussed in further details below, the inventors of the present disclosure discover that, surprisingly and unexpectedly, the bandwidth of the antenna can be significantly increased by having a radiating plate RP that is divided into a plurality of radiating blocks BK.

In some embodiments, the plurality of radiating blocks BK are formed by dividing a plate with one or more slits. The plate, prior to the dividing, may have a regular shape such as a polygonal shape, a circular shape, a cross shape, an elliptical shape, or an oval shape. A combination of the plurality of radiating blocks BK has an overall shape that is substantially the same as the shape of the plate prior to dividing. As shown in FIG. 1F, an overall contour of the plurality of radiating blocks BK has a square shape, which is the shape of the plate before it's being divided into the plurality of radiating blocks BK by a plurality of first slits SL1 and a plurality of second slits SL2.

The combination of the plurality of radiating blocks BK may have various appropriate shapes. Examples of appropriate shapes include a polygonal shape (e.g., a rectangular shape or a square shape), a circular shape, a cross shape, an elliptical shape, or an oval shape, and so on.

In some embodiments, the plurality of radiating blocks BK are spaced apart by a plurality of first slits SL1 and a plurality of second slits SL2. A respective one of the plurality of first slits SL1 extend substantially along a first direction DR1. A respective one of the plurality of second slits SL2 extend substantially along a second direction SR2, the second direction DR2 being different from the first direction DR1. As used herein, the term "extends substantially along" refers to an angle between the extension direction and the reference direction is in a range of 0 degree to approximately 15 degrees, e.g., 0 degree, 0 degree to 1 degree, 1 degree to 2 degrees, 2 degree to 5 degrees, 5 degree to 10 degrees, and 10 degree to 15 degrees.

Figure 2B:
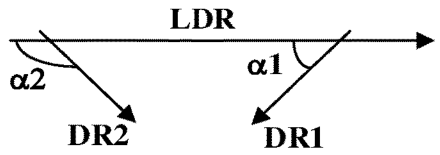
FIG. 2B illustrates included angles between a longitudinal direction of a slot and extension directions of slits in some embodiments according to the present disclosure.

Referring to FIG. 1A and FIG. 1D, the slot ST in some embodiments has a strip shape. A longitudinal direction of the slot ST is denoted as LDR in FIG. 1D. FIG. 2B illustrates included angles between a longitudinal direction of a slot and extension directions of slits in some embodiments according to the present disclosure. Referring to FIG. 2B, the longitudinal direction LDR of the slot ST has a first included angle $\alpha 1$ with respect to the first direction DR1, and a second included angle $\alpha 2$ with respect to the second direction DR2.

The inventors of the present disclosure discover that, surprisingly and unexpectedly, values of the first included angle $\alpha 1$ and the second included angle $\alpha 2$ can also affect the performance of the antenna, e.g., to achieve increased bandwidth and gain. In some embodiments, as shown in FIG. 2B, the first included angle $\alpha 1$ is in a range of 35 degrees to 55 degrees (e.g., 35 degrees to 40 degrees, 40 degrees to 45 degrees, 45 degrees to 50 degrees, or 50 degrees to 55 degrees,); and the second included angle $\alpha 2$ is in a range of 125 degrees to 145 degrees (e.g., 125 degrees to 130 degrees, 130 degrees to 135 degrees, 135 degrees to 140 degrees, or 140 degrees to 145 degrees). In one example, the first included angle $\alpha 1$ is 45 degrees, and the second included angle $\alpha 2$ is 135 degrees. A synergistic effect can be achieved by adopting a radiating plate including a plurality of radiating blocks and having the first included angle and the second included angle in the above-mentioned ranges.

Figure 2C:
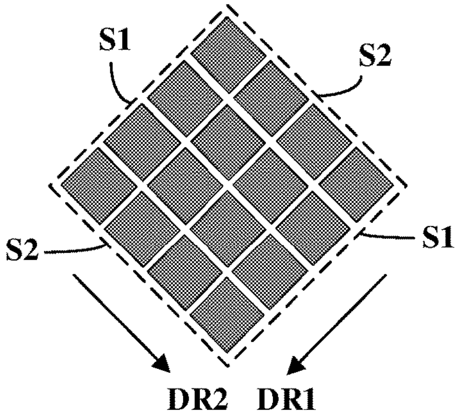
FIG. 2C illustrates an overall shape of a radiating plate of the antenna depicted in FIG. 1A.

The inventors of the present disclosure discover that, surprisingly and unexpectedly, orientation of the radiating plate relative to the ground plate can further affect the performance of the antenna, e.g., to achieve increased bandwidth and gain. FIG. 2C illustrates an overall shape of a radiating plate of the antenna depicted in FIG. 1A. In some embodiments, as shown in FIG. 1A to FIG. 1F, FIG. 2B, and FIG. 2C, the radiating plate RP has an overall polygonal shape (e.g., a square shape) having a plurality of sides (e.g., four sides of a square shape). Optionally, the plurality of sides comprises first sides S1 extending along the first direction DR1 and second sides S2 extending along a second direction DR2. The longitudinal direction LDR of the slot ST has a first included angle $\alpha 1$ with respect to the first direction DR1, and a second included angle $\alpha 2$ with respect to the second direction DR2. In particular, the inventors of the present disclosure discover that an improved antenna bandwidth and gain can be achieved when the first included angle $\alpha 1$ is in a range of 35 degrees to 55 degrees (e.g., 35 degrees to 40 degrees, 40 degrees to 45 degrees, 45 degrees to 50 degrees, or 50 degrees to 55 degrees,); and the second included angle $\alpha 2$ is in a range of 125 degrees to 145 degrees (e.g., 125 degrees to 130 degrees, 130 degrees to 135 degrees, 135 degrees to 140 degrees, or 140 degrees to 145 degrees). In one example, the first included angle $\alpha 1$ is 45 degrees, and the second included angle $\alpha 2$ is 135 degrees.

In some embodiments, referring to FIG. 1A and FIG. 1F, the plurality of first slits SL1 are equispaced, and the plurality of second slits SL2 are equispaced. Inter-slit distances of the plurality of first slits SL1 may be the same as or different from inter-slit distances of the plurality of second slits SL2. In one specific example as depicted in FIG. 1A and FIG. 1F, inter-slit distances of the plurality of first slits SL1 are substantially the same as inter-slit distances of the plurality of second slits SL2.

Figure 3A:
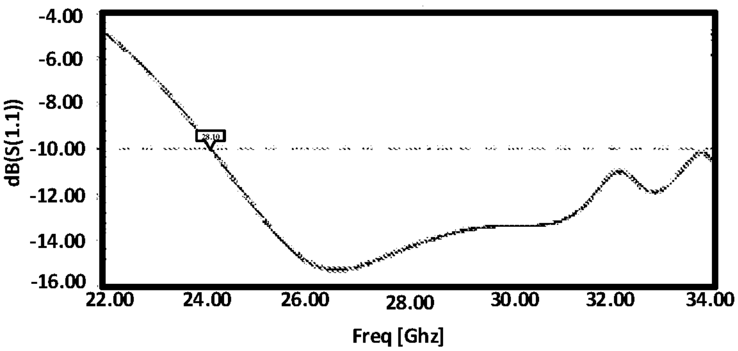
FIG. 3A illustrates an S11 graph of the antenna depicted in FIG. 1A.
Figure 3B:
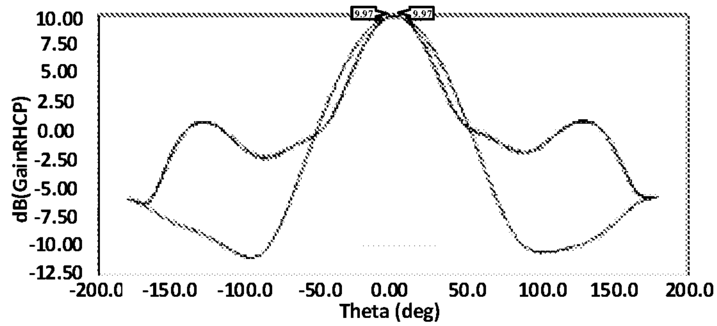
FIG. 3B illustrates a realized gain curve of the antenna depicted in FIG. 1A at a central frequency point.
Figure 3C:
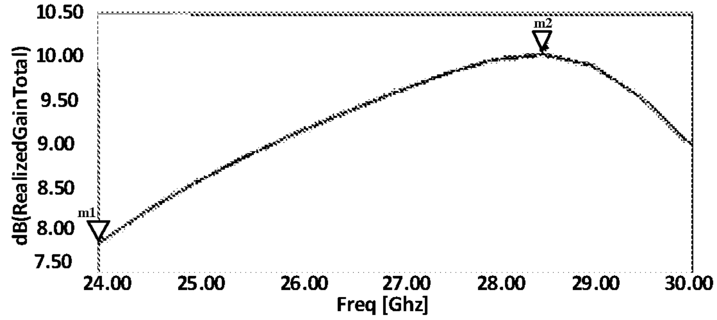
FIG. 3C illustrates a realized gain curve of the antenna depicted in FIG. 1A in a frequency range of 24 GHz to 30 GHz.

In one specific example, the first dielectric layer DL1 has a thickness of 0.05 mm, and the second dielectric layer DL2 has a thickness of 0.65 mm. Values of Dk/Df for the first dielectric layer DL1 and the second dielectric layer DL2 are 3.38/0.0027. Each of the first conductive layer CL1, the second conductive layer CL2, and the third conductive layer CL3 has a thickness of 18.0 μm. Referring to FIG. 1A to FIG. 1F, and FIG. 2A to FIG. 2C, the radiating plate RP includes a plurality of radiating blocks BK, forming a periodic capacitors in series that are simultaneously activated via different resonant modes through the slot ST. First sides S1 of the overall shape of the antenna have a first included angle $\alpha 1$ with respect to the longitudinal direction LDR of the slot ST of 45 degrees, second sides S2 of the overall shape of the antenna have a second included angle $\alpha 2$ with respect to the longitudinal direction LDR of the slot ST of 135 degrees. A synergistic effect can be achieved, resulting in a significantly increased bandwidth and gain. FIG. 3A illustrates an S11 graph of the antenna depicted in FIG. 1A. Referring to FIG. 3A, the antenna has a −10 dB impedance bandwidth of 9.88 GHz (ranging from 24.12 GHz to 34.0 GHz), with a relative bandwidth of 34.0%. FIG. 3B illustrates a realized gain curve of the antenna depicted in FIG. 1A at a central frequency point. Referring to FIG. 3B, the gain at the central frequency point (28 GHz) is 9.97 dBi. FIG. 3C illustrates a realized gain curve of the antenna depicted in FIG. 1A in a frequency range of 24 GHz to 30 GHz. Referring to FIG. 3C, in the frequency range of 24 GHz to 30 GHz, a minimum value of gain is 7.85 dBi at a frequency point 24 GHz, and a maximum value of gain is 10.03 dBi at a frequency point 28.5 GHz. A variation range of the gain values is 2.18 dB.

Figure 4A:
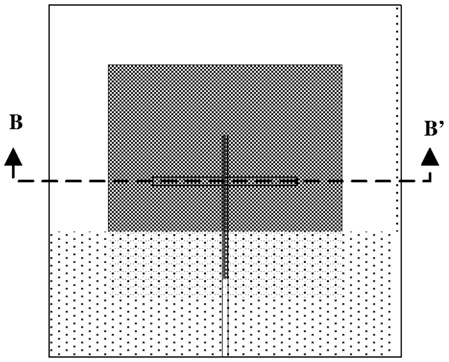
FIG. 4A is a plan view of an antenna in some embodiments according to the present disclosure.
Figure 4B:
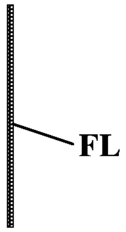
FIG. 4B illustrates the structure of a first conductive layer in an antenna depicted in FIG. 4A.
Figure 4C:
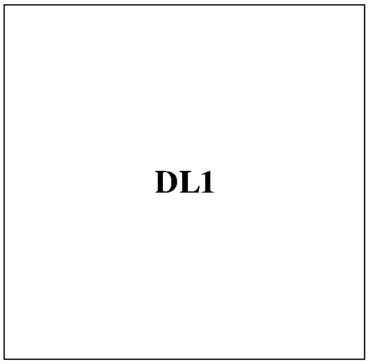
FIG. 4C illustrates the structure of a first dielectric layer in an antenna depicted in FIG. 4A.
Figure 4D:
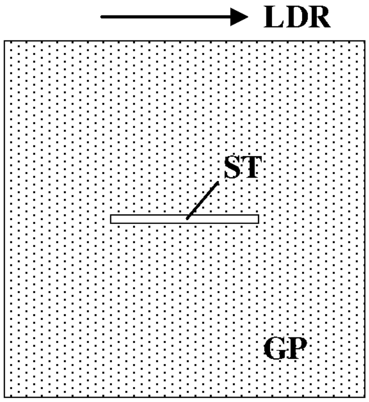
FIG. 4D illustrates the structure of a second conductive layer in an antenna depicted in FIG. 4A.
Figure 4E:
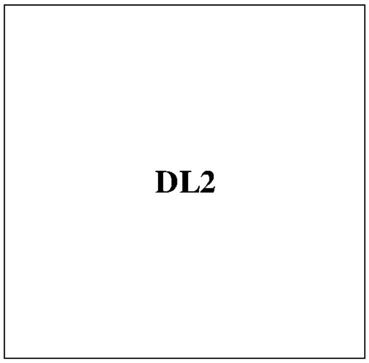
FIG. 4E illustrates the structure of a second dielectric layer in an antenna depicted in FIG. 4A.
Figure 4F:
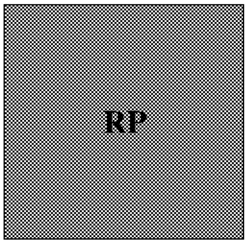
FIG. 4F illustrates the structure of a third conductive layer in an antenna depicted in FIG. 4A.
Figure 5A:
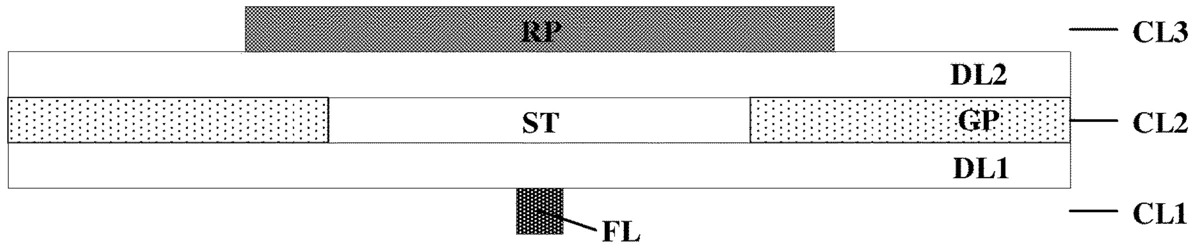
FIG. 5A is a cross-sectional view along a B-B' line in FIG. 4A.

FIG. 4A is a plan view of an antenna in some embodiments according to the present disclosure. FIG. 4B illustrates the structure of a first conductive layer in an antenna depicted in FIG. 4A. FIG. 4C illustrates the structure of a first dielectric layer in an antenna depicted in FIG. 4A. FIG. 4D illustrates the structure of a second conductive layer in an antenna depicted in FIG. 4A. FIG. 4E illustrates the structure of a second dielectric layer in an antenna depicted in FIG. 4A. FIG. 4F illustrates the structure of a third conductive layer in an antenna depicted in FIG. 4A. FIG. 5A is a cross-sectional view along a B-B' line in FIG. 4A. Referring to FIG. 4A to FIG. 4F, and FIG. 5B, the radiating plate RP in some embodiments is a unitary structure, e.g., without being divided into a plurality of radiating blocks.

Figure 5B:
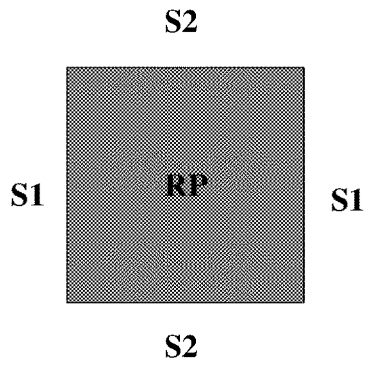
FIG. 5B illustrates an overall shape of a radiating plate of the antenna depicted in FIG. 4A.

FIG. 5B illustrates an overall shape of a radiating plate of the antenna depicted in FIG. 4A. Referring to FIG. 5B, the radiating plate RP has an overall polygonal shape (e.g., a square shape) having a plurality of sides (e.g., four sides of a square shape). Optionally, the plurality of sides comprises first sides S1 and second sides S2. Referring to FIG. 5B and FIG. 4D, the first sides S1 extend along a direction substantially perpendicular to the longitudinal direction LDR of the slot ST, and the second sides S2 extend along a direction substantially parallel to the longitudinal direction LDR of the slot ST.

Figure 6A:
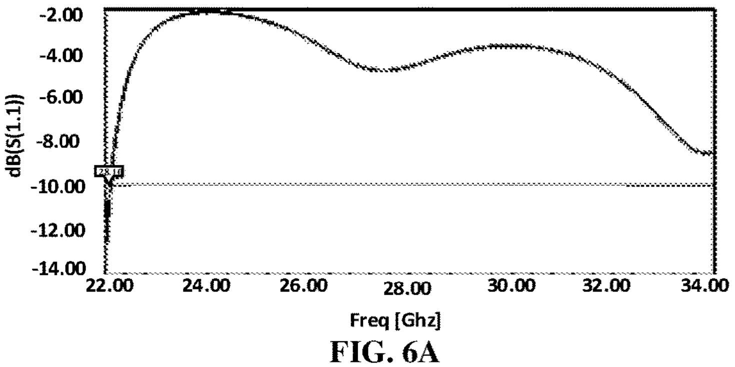
FIG. 6A illustrates an S11 graph of the antenna depicted in FIG. 4A.
Figure 6B:
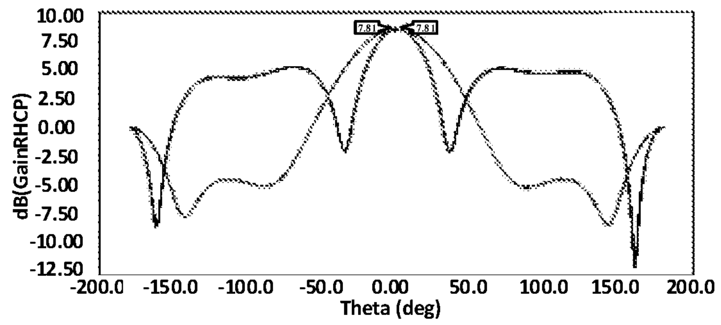
FIG. 6B illustrates a realized gain curve of the antenna depicted in FIG. 4A at a central frequency point.
Figure 6C:
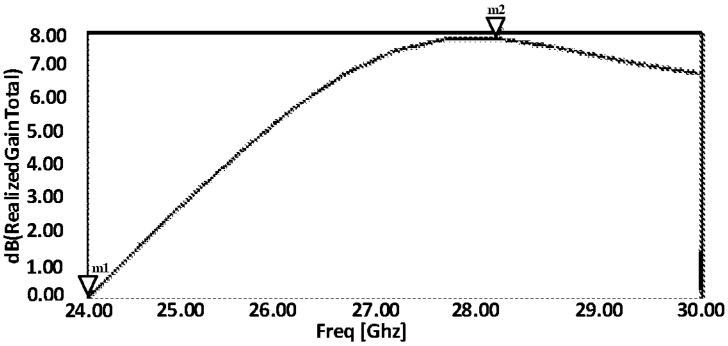
FIG. 6C illustrates a realized gain curve of the antenna depicted in FIG. 4A in a frequency range of 24 GHz to 30 GHz.

FIG. 6A illustrates an S11 graph of the antenna depicted in FIG. 4A. Referring to FIG. 6A, the antenna has a −10 dB impedance bandwidth of 0 GHz. FIG. 6B illustrates a realized gain curve of the antenna depicted in FIG. 4A at a central frequency point. Referring to FIG. 6B, the gain at the central frequency point (28 GHz) is 7.81 dBi. FIG. 6C illustrates a realized gain curve of the antenna depicted in FIG. 4A in a frequency range of 24 GHz to 30 GHz. Referring to FIG. 6C, in the frequency range of 24 GHz to 30 GHz, a minimum value of gain is 0 dBi at a frequency point 24 GHz, and a maximum value of gain is 7.81 dBi at a frequency point 28 GHz. A variation range of the gain values is 7.81 dB. As compared to the antenna depicted in FIG. 1A, the relative impedance bandwidth of the antenna depicted in FIG. 4A deteriorates significantly; the gain at the central frequency point decreases; and the variation range of the gain values increases significantly.

By dividing the radiating plate into a plurality of radiating blocks, having the included angles between the longitudinal direction of a slot and extension directions of slits in certain ranges, and having the included angles between the longitudinal direction of a slot and extension directions of first sides and second sides of the overall shape of the radiating plate in certain ranges, the performance of the antenna can be significantly improved without the need for an additional feed network to improve the antenna gain.

Figure 7A:
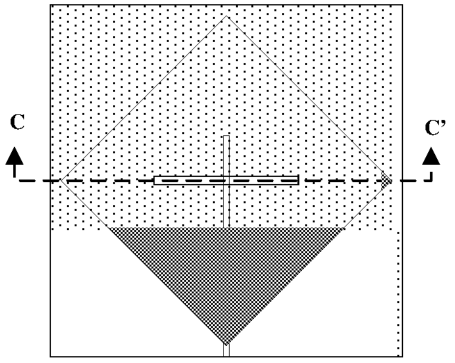
FIG. 7A is a plan view of an antenna in some embodiments according to the present disclosure.
Figure 7B:
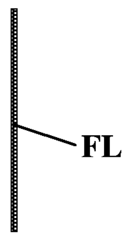
FIG. 7B illustrates the structure of a first conductive layer in an antenna depicted in FIG. 7A.
Figure 7C:
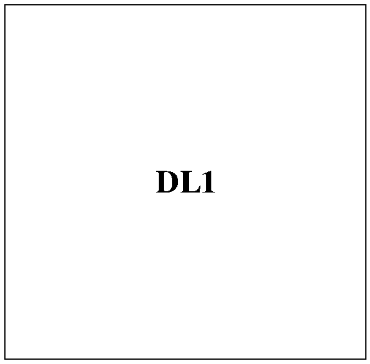
FIG. 7C illustrates the structure of a first dielectric layer in an antenna depicted in FIG. 7A.
Figure 7D:
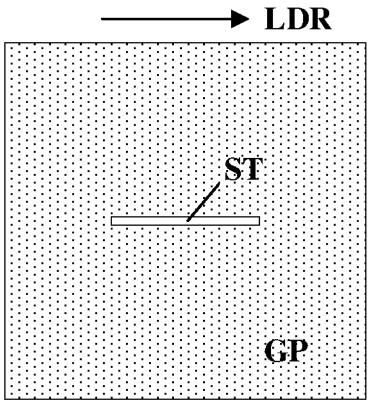
FIG. 7D illustrates the structure of a second conductive layer in an antenna depicted in FIG. 7A.
Figure 7E:
FIG. 7E illustrates the structure of a second dielectric layer in an antenna depicted in FIG. 7A.
Figure 7F:
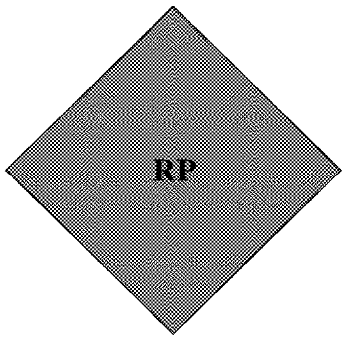
FIG. 7F illustrates the structure of a third conductive layer in an antenna depicted in FIG. 7A.
Figure 8A:
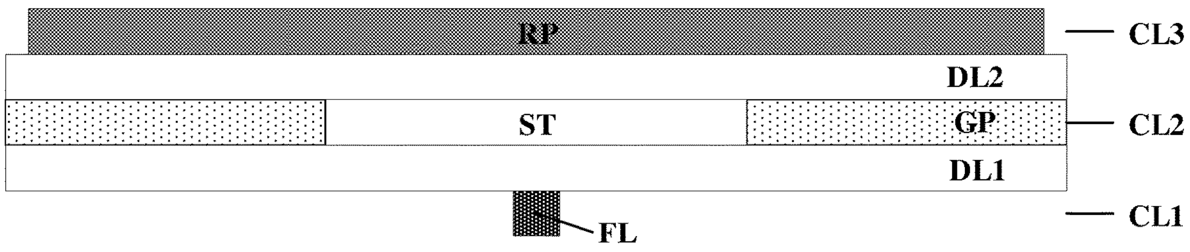
FIG. 8A is a cross-sectional view along a C-C' line in FIG. 7A.

FIG. 7A is a plan view of an antenna in some embodiments according to the present disclosure. FIG. 7B illustrates the structure of a first conductive layer in an antenna depicted in FIG. 7A. FIG. 7C illustrates the structure of a first dielectric layer in an antenna depicted in FIG. 7A. FIG. 7D illustrates the structure of a second conductive layer in an antenna depicted in FIG. 7A. FIG. 7E illustrates the structure of a second dielectric layer in an antenna depicted in FIG. 7A. FIG. 7F illustrates the structure of a third conductive layer in an antenna depicted in FIG. 7A. FIG. 8A is a cross-sectional view along a C-C' line in FIG. 7A. Referring to FIG. 7A to FIG. 7F, and FIG. 8B, the radiating plate RP in some embodiments is a unitary structure, e.g., without being divided into a plurality of radiating blocks.

Figure 8B:
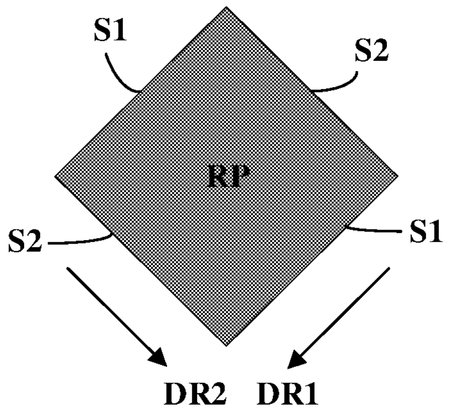
FIG. 8B illustrates an overall shape of a radiating plate of the antenna depicted in FIG. 7A.
Figure 8C:
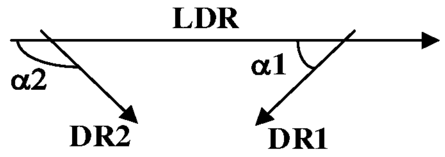
FIG. 8C illustrates included angles between a longitudinal direction of a slot and extension directions of first sides and second sides of an overall shape of a radiating plate in some embodiments according to the present disclosure.

FIG. 8B illustrates an overall shape of a radiating plate of the antenna depicted in FIG. 7A. FIG. 8C illustrates included angles between a longitudinal direction of a slot and extension directions of first sides and second sides of an overall shape of a radiating plate in some embodiments according to the present disclosure. Referring to FIG. 8B and FIG. 8C, the radiating plate RP has an overall polygonal shape (e.g., a square shape) having first sides S1 extending along the first direction DR1 and second sides S2 extending along a second direction DR2. The longitudinal direction LDR of the slot ST has a first included angle α1 with respect to the first direction DR1, and a second included angle α2 with respect to the second direction DR2. The first included angle α1 is in a range of 35 degrees to 55 degrees (e.g., 35 degrees to 40 degrees, 40 degrees to 45 degrees, 45 degrees to 50 degrees, or 50 degrees to 55 degrees,); and the second included angle α2 is in a range of 125 degrees to 145 degrees (e.g., 125 degrees to 130 degrees, 130 degrees to 135 degrees, 135 degrees to 140 degrees, or 140 degrees to 145 degrees). In one example depicted in FIG. 8C, the first included angle α1 is 45 degrees, and the second included angle α2 is 135 degrees.

Figure 9A:
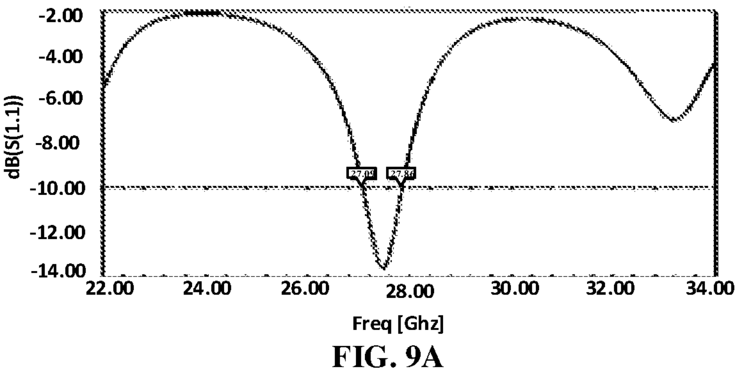
FIG. 9A illustrates an S11 graph of the antenna depicted in FIG. 7A.
Figure 9B:
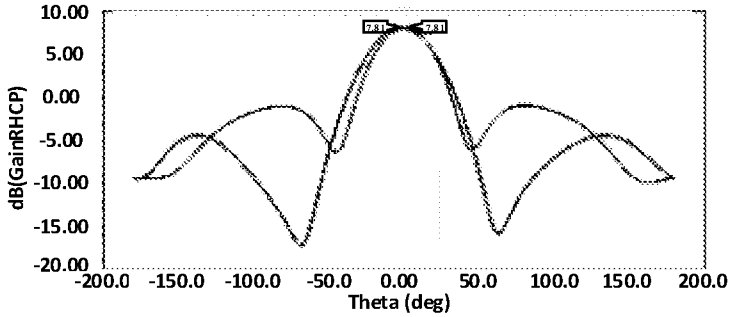
FIG. 9B illustrates a realized gain curve of the antenna depicted in FIG. 7A at a central frequency point.
Figure 9C:
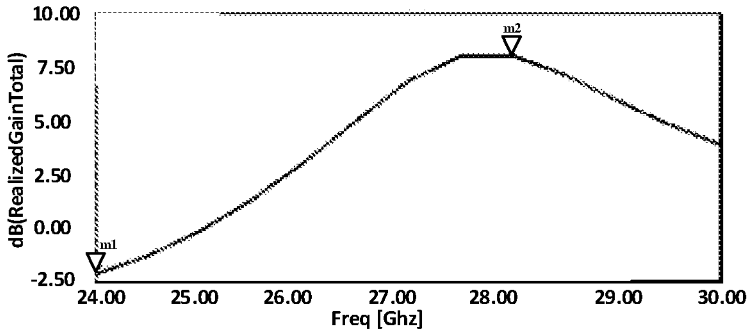
FIG. 9C illustrates a realized gain curve of the antenna depicted in FIG. 7A in a frequency range of 24 GHz to 30 GHz.

FIG. 9A illustrates an S11 graph of the antenna depicted in FIG. 7A. FIG. 9B illustrates a realized gain curve of the antenna depicted in FIG. 7A at a central frequency point. FIG. 9C illustrates a realized gain curve of the antenna depicted in FIG. 7A in a frequency range of 24 GHz to 30 GHz.

Referring to FIG. 9A, the antenna has a −10 dB impedance bandwidth of 0.77 GHz (ranging from 27.09 GHz to 27.86 GHz). Referring to FIG. 9B, the gain at the central frequency point (28 GHz) is 8.04 dBi. Referring to FIG. 9C, in the frequency range of 24 GHz to 30 GHz, a minimum value of gain is −2.06 dBi at a frequency point 24 GHz, and a maximum value of gain is 8.04 dBi at a frequency point 28 GHz. A variation range of the gain values is 10.1 dB. As compared to the antenna depicted in FIG. 1A, the relative impedance bandwidth of the antenna depicted in FIG. 7A deteriorates significantly; the gain at the central frequency point decreases; and the variation range of the gain values increases significantly. As compared to the antenna depicted in FIG. 4A, the relative impedance bandwidth of the antenna depicted in FIG. 7A increases, the gain at the central frequency point slightly increases, and the variation range of the gain values increases.

Comparing the antenna depicted in FIG. 4A with the antenna depicted in FIG. 7A, by having the included angles between the longitudinal direction of a slot and extension directions of first sides and second sides of the overall shape of the radiating plate in certain ranges (e.g., 45 degrees and 135 degrees), the performance of the antenna can be improved.

Figure 10A:
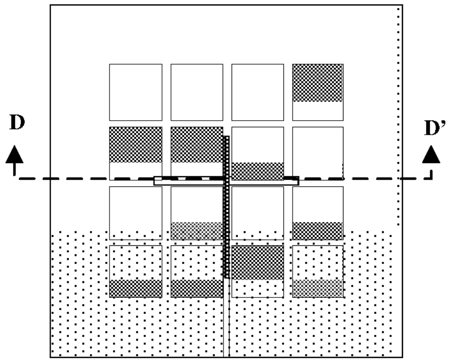
FIG. 10A is a plan view of an antenna in some embodiments according to the present disclosure.
Figure 10B:
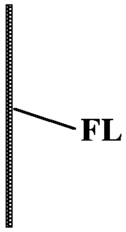
FIG. 10B illustrates the structure of a first conductive layer in an antenna depicted in FIG. 10A.
Figure 10C:
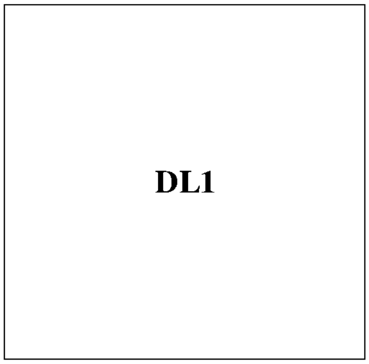
FIG. 10C illustrates the structure of a first dielectric layer in an antenna depicted in FIG. 10A.
Figure 10D:
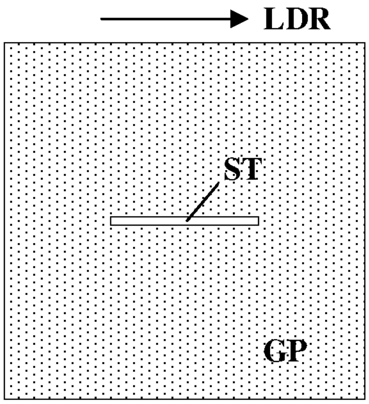
FIG. 10D illustrates the structure of a second conductive layer in an antenna depicted in FIG. 10A.
Figure 10E:
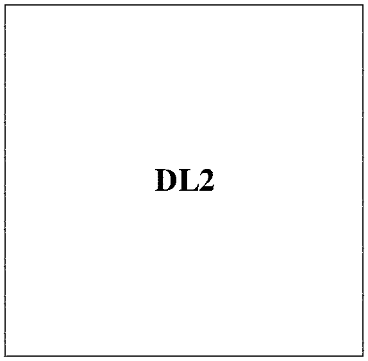
FIG. 10E illustrates the structure of a second dielectric layer in an antenna depicted in FIG. 10A.
Figure 10F:
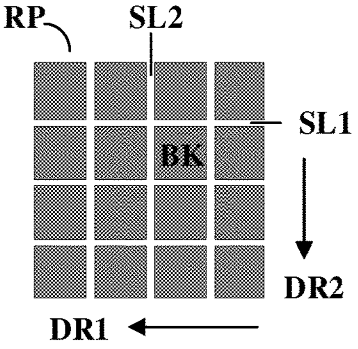
FIG. 10F illustrates the structure of a third conductive layer in an antenna depicted in FIG. 10A.

FIG. 10A is a plan view of an antenna in some embodiments according to the present disclosure. FIG. 10B illustrates the structure of a first conductive layer in an antenna depicted in FIG. 10A. FIG. 10C illustrates the structure of a first dielectric layer in an antenna depicted in FIG. 10A. FIG. 10D illustrates the structure of a second conductive layer in an antenna depicted in FIG. 10A. FIG. 10E illustrates the structure of a second dielectric layer in an antenna depicted in FIG. 10A. FIG. 10F illustrates the structure of a third conductive layer in an antenna depicted in FIG. 10A.

Figure 11A:
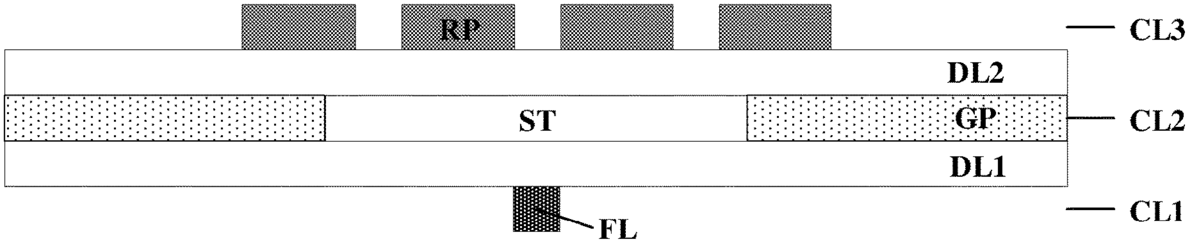
FIG. 11A is a cross-sectional view along a D-D' line in FIG. 10A.
Figure 11B:
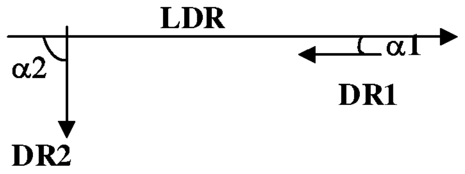
FIG. 11B illustrates included angles between a longitudinal direction of a slot and extension directions of slits in some embodiments according to the present disclosure.
Figure 11C:
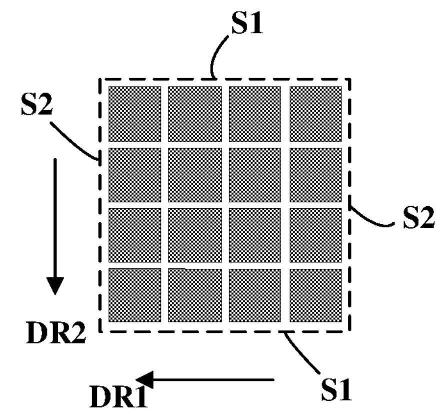
FIG. 11C illustrates an overall shape of a radiating plate of the antenna depicted in FIG. 10A.

FIG. 11A is a cross-sectional view along a D-D' line in FIG. 10A. FIG. 11B illustrates included angles between a longitudinal direction of a slot and extension directions of slits in some embodiments according to the present disclosure. FIG. 11C illustrates an overall shape of a radiating plate of the antenna depicted in FIG. 10A.

Comparing the antenna depicted in FIG. 10A with the antenna depicted in FIG. 1A, extension directions of the slits relative to the longitudinal direction of the slot in the antenna depicted in FIG. 10A are different from those in the antenna depicted in FIG. 1A. Referring to FIG. 10A, FIG. 10D, FIG. 10F, and FIG. 11B, a respective one of the plurality of first slits SL1 extend substantially along a first direction DR1. A respective one of the plurality of second slits SL2 extend substantially along a second direction SR2, the second direction DR2 being different from the first direction DR1. The longitudinal direction LDR of the slot ST has a first included angle α1 with respect to the first direction DR1, and a second included angle α2 with respect to the second direction DR2. In the antenna depicted in FIG. 10A, the first included angle α1 is in a range of −10 degrees to 10 degrees (e.g., −10 degrees to −5 degrees, −5 degrees to 0 degrees, 0 degrees to 5 degrees, or 5 degrees to 10 degrees), and the second included angle α2 is in a range of 80 degrees to 100 degrees (e.g., 80 degrees to 85 degrees, 85 degrees to 90 degrees, 90 degrees to 95 degrees, 95 degrees to 100 degrees). In one example as depicted in FIG. 11B, the first included angle α1 is 0 degrees, and the second included angle α2 is 90 degrees. In another example as depicted in FIG. 2B, the first included angle α1 is 45 degrees, and the second included angle α2 is 135 degrees.

Comparing the antenna depicted in FIG. 10A with the antenna depicted in FIG. 1A, the orientation of the radiating plate relative to the ground plate in the antenna depicted in FIG. 10A is different from those in the antenna depicted in FIG. 1A. Referring to FIG. 10A, FIG. 10D, FIG. 10F, and FIG. 11B, the radiating plate RP has an overall polygonal shape (e.g., a square shape) having first sides S1 extending along the first direction DR1 and second sides S2 extending along a second direction DR2. The longitudinal direction LDR of the slot ST has a first included angle α1 with respect to the first direction DR1, and a second included angle α2 with respect to the second direction DR2. In the antenna depicted in FIG. 10A, the first included angle α1 is in a range of −10 degrees to 10 degrees (e.g., −10 degrees to −5 degrees, −5 degrees to 0 degrees, 0 degrees to 5 degrees, or 5 degrees to 10 degrees), and the second included angle α2 is in a range of 80 degrees to 100 degrees (e.g., 80 degrees to 85 degrees, 85 degrees to 90 degrees, 90 degrees to 95 degrees, or 95 degrees to 100 degrees). In one example as depicted in FIG. 11B, the first included angle α1 is 0 degrees, and the second included angle α2 is 90 degrees. In another example as depicted in FIG. 2B, the first included angle α1 is 45 degrees, and the second included angle α2 is 135 degrees.

Figure 12A:
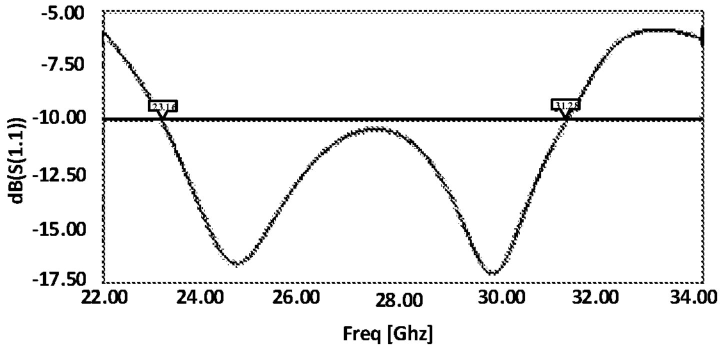
FIG. 12A illustrates an S11 graph of the antenna depicted in FIG. 10A.
Figure 12B:
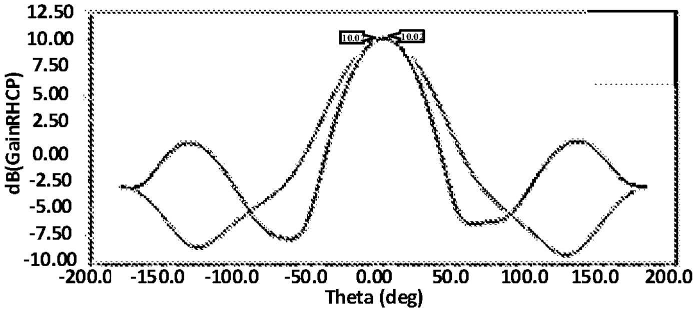
FIG. 12B illustrates a realized gain curve of the antenna depicted in FIG. 10A at a central frequency point.
Figure 12C:
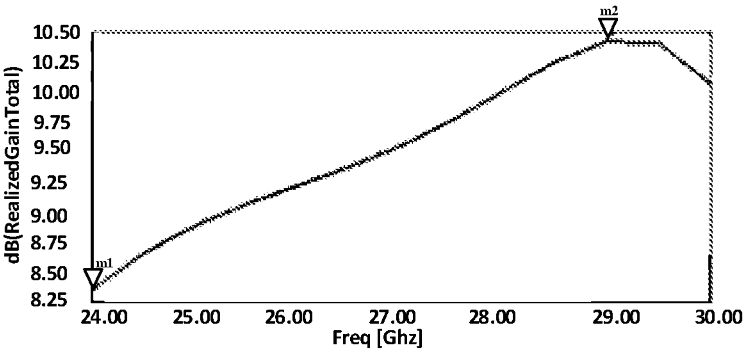
FIG. 12C illustrates a realized gain curve of the antenna depicted in FIG. 10A in a frequency range of 24 GHz to 30 GHz.

FIG. 12A illustrates an S11 graph of the antenna depicted in FIG. 10A. FIG. 12B illustrates a realized gain curve of the antenna depicted in FIG. 10A at a central frequency point. FIG. 12C illustrates a realized gain curve of the antenna depicted in FIG. 10A in a frequency range of 24 GHz to 30 GHz.

Referring to FIG. 12A, the antenna has a −10 dB impedance bandwidth of 8.12 GHz (ranging from 23.16 GHz to 31.28 GHz), with a relative bandwidth of 29.8%. Referring to FIG. 12B, the gain at the central frequency point (28 GHz)

is 10.02 dBi. Referring to FIG. 12C, in the frequency range of 24 GHz to 30 GHz, a minimum value of gain is 8.27 dBi at a frequency point 24 GHz, and a maximum value of gain is 10.42 dBi at a frequency point 29 GHz. A variation range of the gain values is 2.15 dB. As compared to the antenna depicted in FIG. 1A, the relative impedance bandwidth of the antenna depicted in FIG. 10A decreases; the gain at the central frequency point remains substantially the same; and the variation range of the gain values remains substantially the same.

Comparing the antenna depicted in FIG. 10A with the antenna depicted in FIG. 1A, by having the included angles between extension directions of the slits and the longitudinal direction of the slot in certain ranges (e.g., 45 degrees and 135 degrees), and by having the included angles between the longitudinal direction of a slot and extension directions of first sides and second sides of the overall shape of the radiating plate in certain ranges (e.g., 45 degrees and 135 degrees), the performance of the antenna can be improved.

Comparing the antenna depicted in FIG. 10A with the antenna depicted in FIG. 4A, by having the radiating plate made of a plurality of radiating blocks, the performance of the antenna can be significantly improved.

Figure 13A:
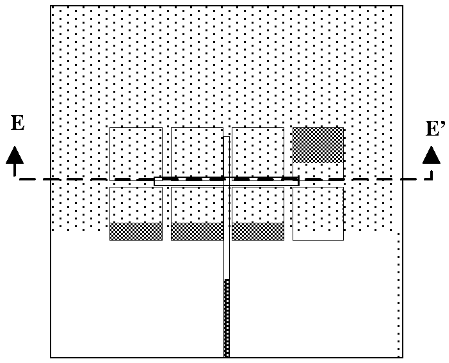
FIG. 13A is a plan view of an antenna in some embodiments according to the present disclosure.
Figure 13B:
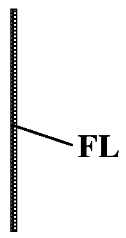
FIG. 13B illustrates the structure of a first conductive layer in an antenna depicted in FIG. 13A.
Figure 13C:
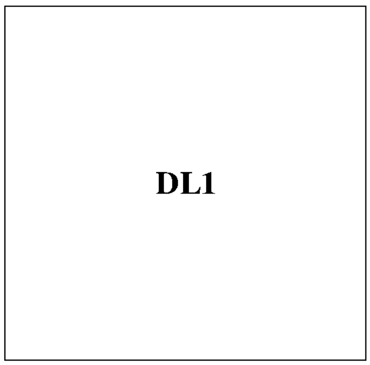
FIG. 13C illustrates the structure of a first dielectric layer in an antenna depicted in FIG. 13A.
Figure 13D:
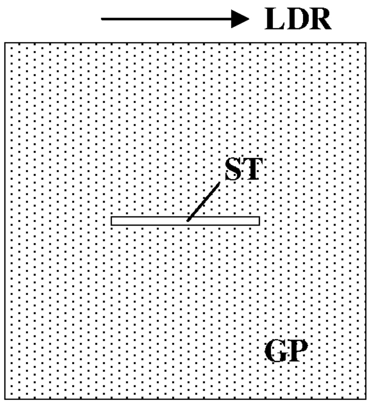
FIG. 13D illustrates the structure of a second conductive layer in an antenna depicted in FIG. 13A.
Figure 13E:
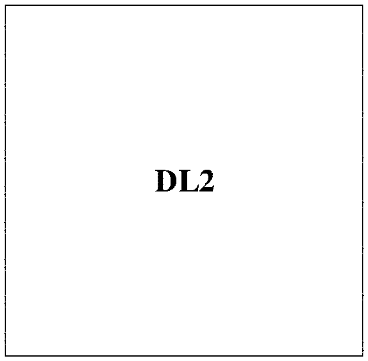
FIG. 13E illustrates the structure of a second dielectric layer in an antenna depicted in FIG. 13A.
Figure 13F:
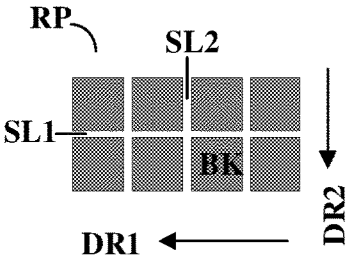
FIG. 13F illustrates the structure of a third conductive layer in an antenna depicted in FIG. 13A.
Figure 14:
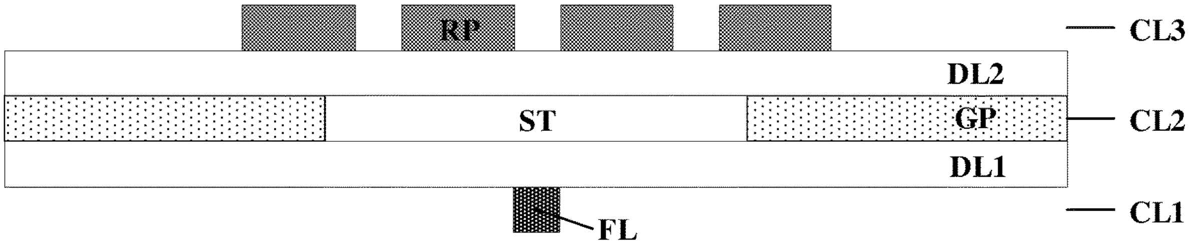
FIG. 14 is a cross-sectional view along a E-E' line in FIG. 13A.

FIG. 13A is a plan view of an antenna in some embodiments according to the present disclosure. FIG. 13B illustrates the structure of a first conductive layer in an antenna depicted in FIG. 13A. FIG. 13C illustrates the structure of a first dielectric layer in an antenna depicted in FIG. 13A. FIG. 13D illustrates the structure of a second conductive layer in an antenna depicted in FIG. 13A. FIG. 13E illustrates the structure of a second dielectric layer in an antenna depicted in FIG. 13A. FIG. 13F illustrates the structure of a third conductive layer in an antenna depicted in FIG. 13A. FIG. 14 is a cross-sectional view along a E-E' line in FIG. 13A. The antenna depicted in FIG. 13A to FIG. 13F differs from the antenna depicted in FIG. 10A to FIG. 10F in that the radiating plate RP has a smaller area. The antenna depicted in FIG. 10A to FIG. 10F has a radiating plate RP comprising four columns and four rows of plurality of radiating blocks, whereas the antenna depicted in FIG. 13A to FIG. 13F has a radiating plate RP comprising four columns and two rows of radiating blocks. The area of the radiating plate RP in the antenna depicted in FIG. 13A to FIG. 13F is half of that in the antenna depicted in FIG. 10A to FIG. 10F. A total number of radiating blocks in the radiating plate RP in the antenna depicted in FIG. 13A to FIG. 13F is half of that in the antenna depicted in FIG. 10A to FIG. 10F.

Figure 15A:
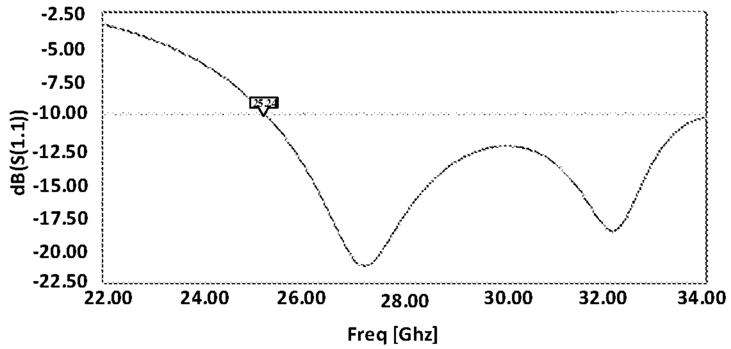
FIG. 15A illustrates an S11 graph of the antenna depicted in FIG. 13A.
Figure 15B:
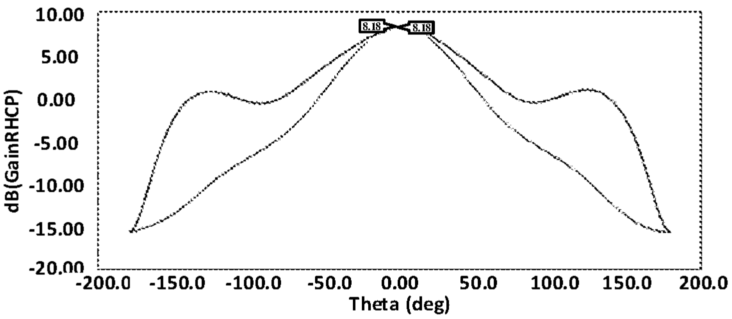
FIG. 15B illustrates a realized gain curve of the antenna depicted in FIG. 13A at a central frequency point.
Figure 15C:
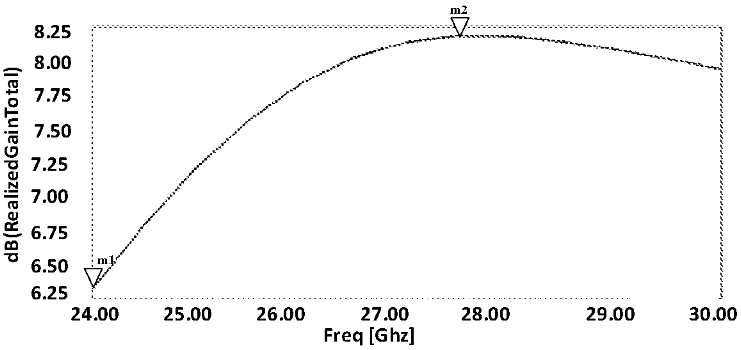
FIG. 15C illustrates a realized gain curve of the antenna depicted in FIG. 13A in a frequency range of 24 GHz to 30 GHz.

FIG. 15A illustrates an S11 graph of the antenna depicted in FIG. 13A. FIG. 15B illustrates a realized gain curve of the antenna depicted in FIG. 13A at a central frequency point. FIG. 15C illustrates a realized gain curve of the antenna depicted in FIG. 13A in a frequency range of 24 GHz to 30 GHz.

Referring to FIG. 15A, the antenna has a −10 dB impedance bandwidth of 8.76 GHz (ranging from 25.24 GHz to 34.00 GHz), with a relative bandwidth of 29.5%. Referring to FIG. 15A, the gain at the central frequency point (28 GHz) is 8.18 dBi. Referring to FIG. 15C, in the frequency range of 24 GHz to 30 GHz, a minimum value of gain is 6.31 dBi at a frequency point 24 GHz, and a maximum value of gain is 8.18 dBi at a frequency point 27.5 GHz. A variation range of the gain values is 1.87 dB. As compared to the antenna depicted in FIG. 1A, the relative impedance bandwidth of the antenna depicted in FIG. 13A decreases; the gain at the central frequency point decreases; and the variation range of the gain values decreases. As compared to the antenna depicted in FIG. 10A, the relative impedance bandwidth of the antenna depicted in FIG. 13A remains substantially the same; the gain at the central frequency point decreases; and the variation range of the gain values decreases.

Figure 16A:
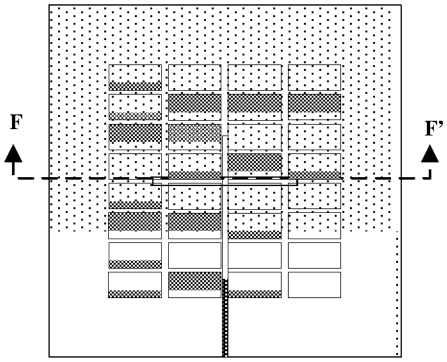
FIG. 16A is a plan view of an antenna in some embodiments according to the present disclosure.
Figure 16B:
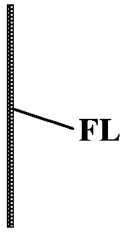
FIG. 16B illustrates the structure of a first conductive layer in an antenna depicted in FIG. 16A.
Figure 16C:
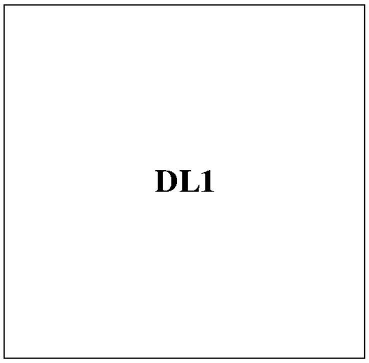
FIG. 16C illustrates the structure of a first dielectric layer in an antenna depicted in FIG. 16A.
Figure 16D:
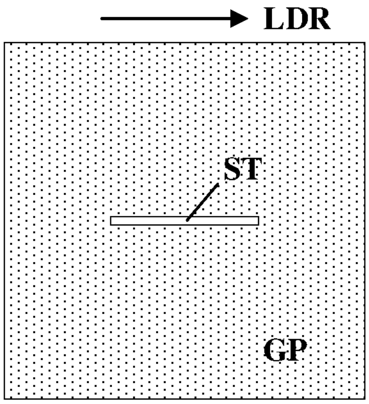
FIG. 16D illustrates the structure of a second conductive layer in an antenna depicted in FIG. 16A.
Figure 16E:
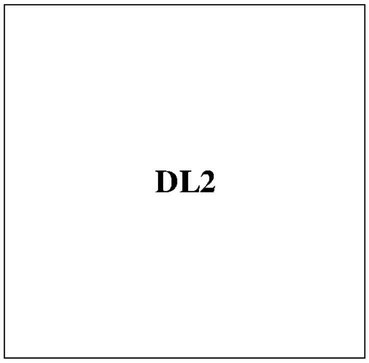
FIG. 16E illustrates the structure of a second dielectric layer in an antenna depicted in FIG. 16A.
Figure 16F:
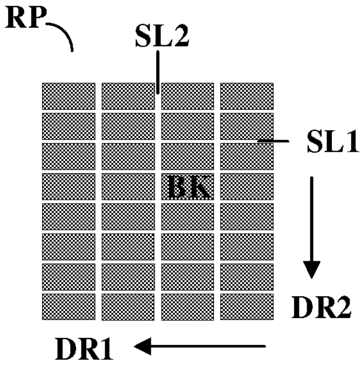
FIG. 16F illustrates the structure of a third conductive layer in an antenna depicted in FIG. 16A.
Figure 17:
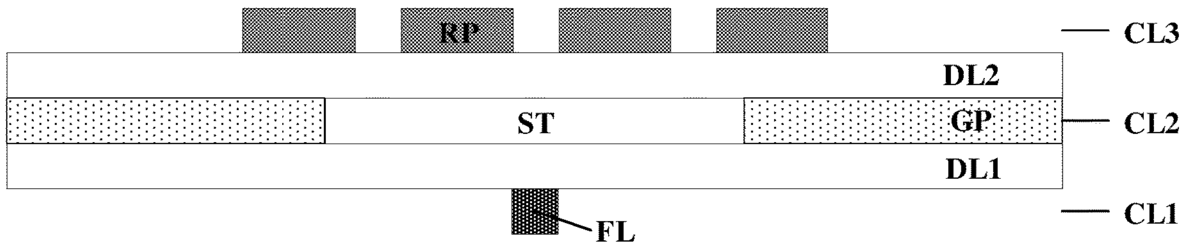
FIG. 17 is a cross-sectional view along an F-F' line in FIG. 16A.

FIG. 16A is a plan view of an antenna in some embodiments according to the present disclosure. FIG. 16B illustrates the structure of a first conductive layer in an antenna depicted in FIG. 16A. FIG. 16C illustrates the structure of a first dielectric layer in an antenna depicted in FIG. 16A. FIG. 16D illustrates the structure of a second conductive layer in an antenna depicted in FIG. 16A. FIG. 16E illustrates the structure of a second dielectric layer in an antenna depicted in FIG. 16A. FIG. 16F illustrates the structure of a third conductive layer in an antenna depicted in FIG. 16A. FIG. 17 is a cross-sectional view along an F-F' line in FIG. 16A. The antenna depicted in FIG. 16A to FIG. 16F differs from the antenna depicted in FIG. 10A to FIG. 10F in that the radiating plate RP is divided into twice as many rows. The antenna depicted in FIG. 16A to FIG. 16F has a same area as the antenna depicted in FIG. 10A to FIG. 10F. The antenna depicted in FIG. 10A to FIG. 10F has a radiating plate RP comprising four columns and four rows of radiating blocks, whereas the antenna depicted in FIG. 16A to FIG. 16F has a radiating plate RP comprising four columns and eight rows of radiating blocks. A total number of radiating blocks in the radiating plate RP in the antenna depicted in FIG. 16A to FIG. 16F is twice of that in the antenna depicted in FIG. 10A to FIG. 10F.

Because a total number of rows increases while a total number of columns remains the same, in some embodiments, inter-slit distances of the plurality of first slits SL1 are different from inter-slit distances of the plurality of second slits SL2. In one example as depicted in FIG. 16F, the inter-slit distances of the plurality of first slits SL1 are half of the inter-slit distances of the plurality of second slits SL2.

Figure 18A:
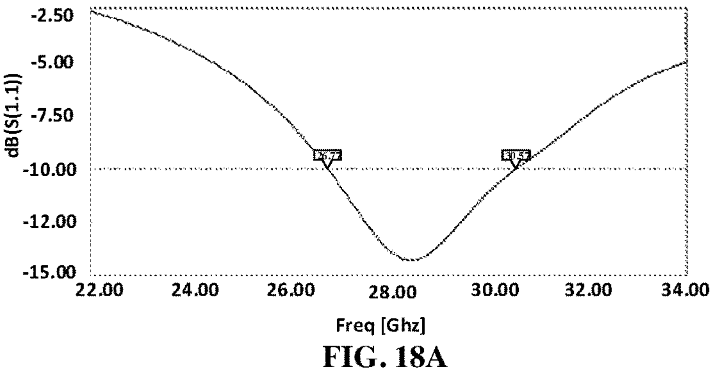
FIG. 18A illustrates an S11 graph of the antenna depicted in FIG. 16A.
Figure 18B:
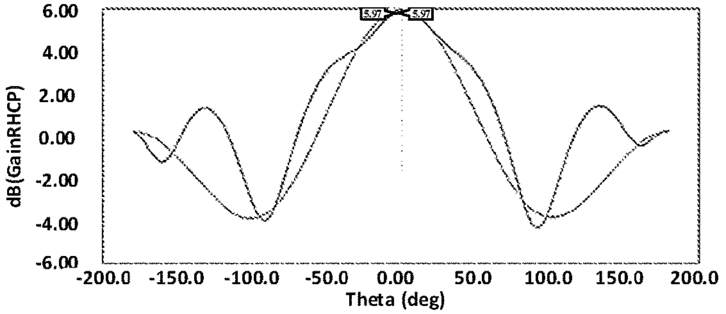
FIG. 18B illustrates a realized gain curve of the antenna depicted in FIG. 16A at a central frequency point.
Figure 18C:
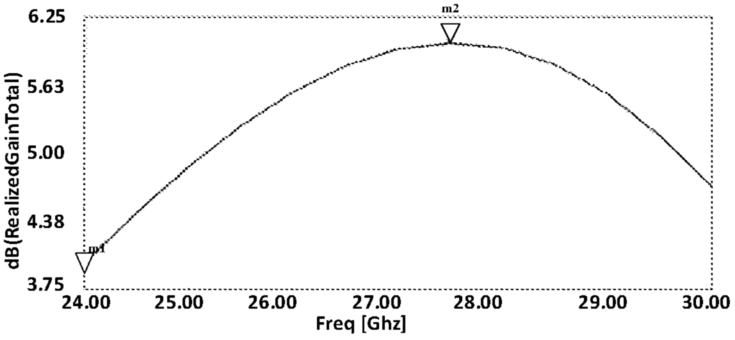
FIG. 18C illustrates a realized gain curve of the antenna depicted in FIG. 16A in a frequency range of 24 GHz to 30 GHz.

FIG. 18A illustrates an S11 graph of the antenna depicted in FIG. 16A. FIG. 18B illustrates a realized gain curve of the antenna depicted in FIG. 16A at a central frequency point. FIG. 18C illustrates a realized gain curve of the antenna depicted in FIG. 16A in a frequency range of 24 GHz to 30 GHz.

Referring to FIG. 18A, the antenna has a −10 dB impedance bandwidth of 3.80 GHz (ranging from 26.77 GHz to 30.57 GHz), with a relative bandwidth of 13.2%. Referring to FIG. 18B, the gain at the central frequency point (28 GHz) is 5.97 dBi. Referring to FIG. 18C, in the frequency range of 24 GHz to 30 GHz, a minimum value of gain is 3.98 dBi at a frequency point 24 GHz, and a maximum value of gain is 6.01 dBi at a frequency point 27.5 GHz. A variation range of the gain values is 2.03 dB.

As compared to the antenna depicted in FIG. 10A, the relative impedance bandwidth of the antenna depicted in FIG. 18A significantly decreases; the gain at the central frequency point decreases; and the variation range of the gain values remains substantially the same. The comparison indicates that, while maintaining an area of the radiating plate substantially the same, increasing a total number of rows of radiating blocks does not always necessarily enhances the performance of the antenna.

Figure 19A:
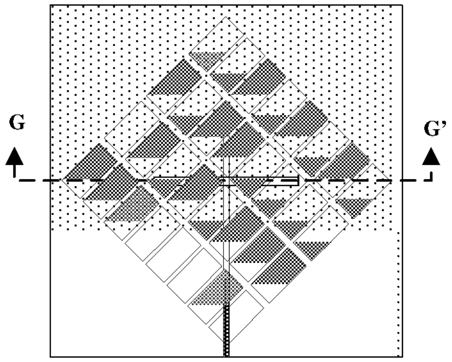
FIG. 19A is a plan view of an antenna in some embodiments according to the present disclosure.
Figure 19B:
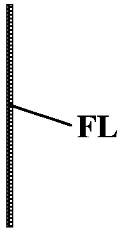
FIG. 19B illustrates the structure of a first conductive layer in an antenna depicted in FIG. 19A.
Figure 19C:
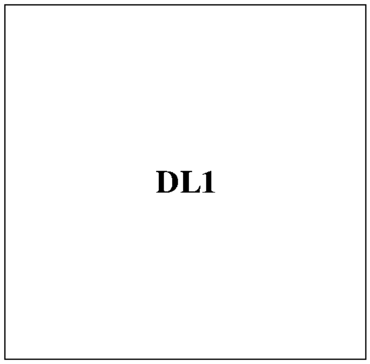
FIG. 19C illustrates the structure of a first dielectric layer in an antenna depicted in FIG. 19A.
Figure 19D:
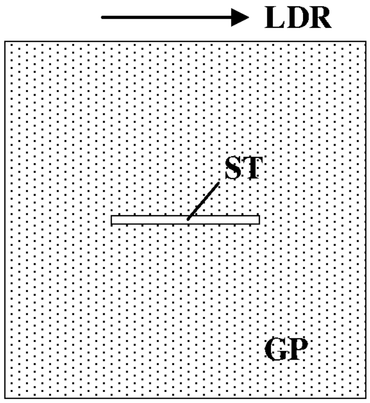
FIG. 19D illustrates the structure of a second conductive layer in an antenna depicted in FIG. 19A.
Figure 19E:
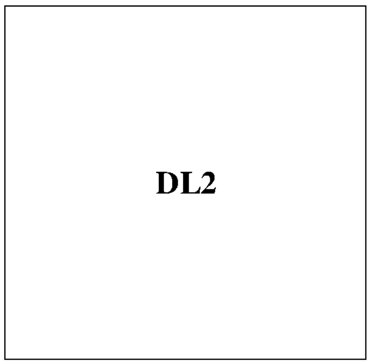
FIG. 19E illustrates the structure of a second dielectric layer in an antenna depicted in FIG. 19A.
Figure 19F:
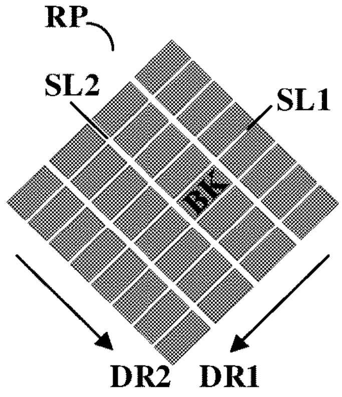
FIG. 19F illustrates the structure of a third conductive layer in an antenna depicted in FIG. 19A.

FIG. 19A is a plan view of an antenna in some embodiments according to the present disclosure. FIG. 19B illustrates the structure of a first conductive layer in an antenna depicted in FIG. 19A. FIG. 19C illustrates the structure of a first dielectric layer in an antenna depicted in FIG. 19A. FIG. 19D illustrates the structure of a second conductive layer in an antenna depicted in FIG. 19A. FIG. 19E illustrates the structure of a second dielectric layer in an antenna depicted in FIG. 19A. FIG. 19F illustrates the structure of a third conductive layer in an antenna depicted in FIG. 19A.

Figure 20A:
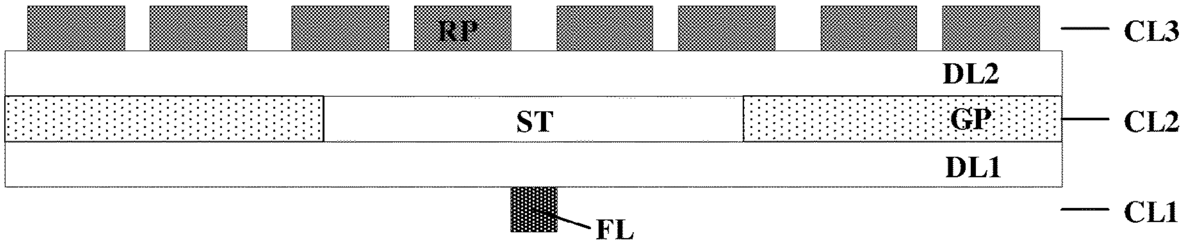
FIG. 20A is a cross-sectional view along a G-G' line in FIG. 19A.
Figure 20B:
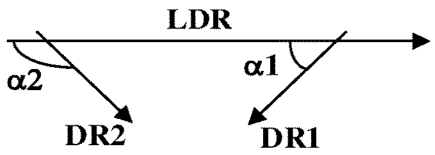
FIG. 20B illustrates included angles between a longitudinal direction of a slot and extension directions of slits in some embodiments according to the present disclosure.
Figure 20C:
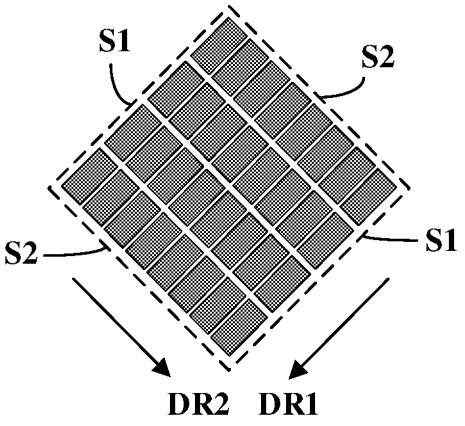
FIG. 20C illustrates an overall shape of a radiating plate of the antenna depicted in FIG. 19A.

FIG. 20A is a cross-sectional view along an G-G' line in FIG. 19A. FIG. 20B illustrates included angles between a longitudinal direction of a slot and extension directions of slits in some embodiments according to the present disclosure. FIG. 20C illustrates an overall shape of a radiating plate of the antenna depicted in FIG. 19A.

Comparing the antenna depicted in FIG. 19A with the antenna depicted in FIG. 16A, extension directions of the slits relative to the longitudinal direction of the slot in the antenna depicted in FIG. 19A are different from those in the antenna depicted in FIG. 16A. Referring to FIG. 19A, FIG. 19D, FIG. 19F, and FIG. 20B, a respective one of the plurality of first slits SL1 extend substantially along a first direction DR1. A respective one of the plurality of second slits SL2 extend substantially along a second direction SR2, the second direction DR2 being different from the first direction DR1. The longitudinal direction LDR of the slot ST has a first included angle $\alpha 1$ with respect to the first direction DR1, and a second included angle $\alpha 2$ with respect to the second direction DR2. In the antenna depicted in FIG. 19A, the first included angle $\alpha 1$ is in a range of 35 degrees to 55 degrees (e.g., 35 degrees to 40 degrees, 40 degrees to 45 degrees, 45 degrees to 50 degrees, or 50 degrees to 55 degrees,); and the second included angle $\alpha 2$ is in a range of 125 degrees to 145 degrees (e.g., 125 degrees to 130 degrees, 130 degrees to 135 degrees, 135 degrees to 140 degrees, or 140 degrees to 145 degrees). In one example, the first included angle $\alpha 1$ is 45 degrees, and the second included angle $\alpha 2$ is 135 degrees.

Comparing the antenna depicted in FIG. 19A with the antenna depicted in FIG. 16A, the orientation of the radiating plate relative to the ground plate in the antenna depicted in FIG. 19A is different from those in the antenna depicted in FIG. 16A. Referring to FIG. 19A, FIG. 19D, FIG. 19F, and FIG. 20B, the radiating plate RP has an overall polygonal shape (e.g., a square shape) having first sides S1 extending along the first direction DR1 and second sides S2 extending along a second direction DR2. The longitudinal direction LDR of the slot ST has a first included angle $\alpha 1$ with respect to the first direction DR1, and a second included angle $\alpha 2$ with respect to the second direction DR2. In the antenna depicted in FIG. 19A, the first included angle $\alpha 1$ is in a range of 35 degrees to 55 degrees (e.g., 35 degrees to 40 degrees, 40 degrees to 45 degrees, 45 degrees to 50 degrees, or 50 degrees to 55 degrees,); and the second included angle $\alpha 2$ is in a range of 125 degrees to 145 degrees (e.g., 125 degrees to 130 degrees, 130 degrees to 135 degrees, 135 degrees to 140 degrees, or 140 degrees to 145 degrees). In one example, the first included angle $\alpha 1$ is 45 degrees, and the second included angle $\alpha 2$ is 135 degrees.

Figure 21A:
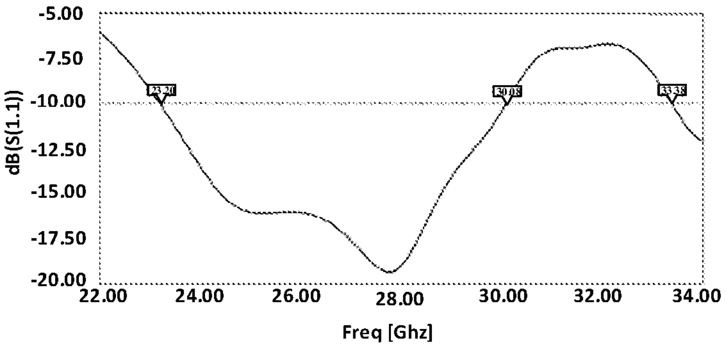
FIG. 21A illustrates an S11 graph of the antenna depicted in FIG. 19A.
Figure 21B:
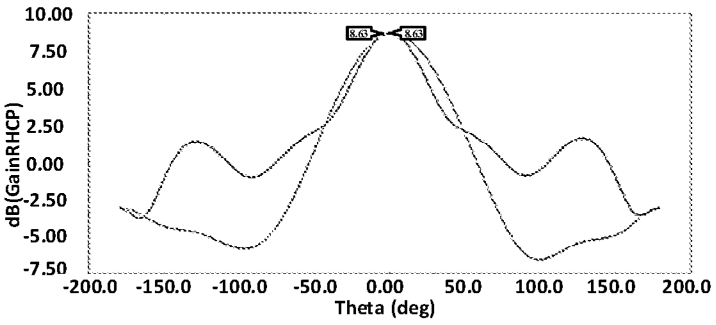
FIG. 21B illustrates a realized gain curve of the antenna depicted in FIG. 19A at a central frequency point.
Figure 21C:
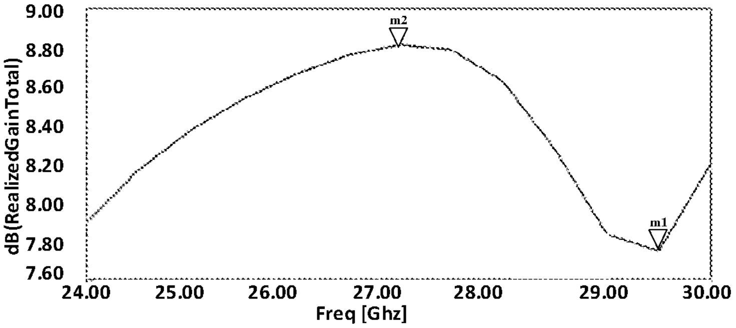
FIG. 21C illustrates a realized gain curve of the antenna depicted in FIG. 19A in a frequency range of 24 GHz to 30 GHz.

FIG. 21A illustrates an S11 graph of the antenna depicted in FIG. 19A. FIG. 21B illustrates a realized gain curve of the antenna depicted in FIG. 19A at a central frequency point. FIG. 21C illustrates a realized gain curve of the antenna depicted in FIG. 19A in a frequency range of 24 GHz to 30 GHz.

Referring to FIG. 21A, the antenna has a −10 dB impedance bandwidth of 6.88 GHz (ranging from 23.20 GHz to 30.08 GHz), with a relative bandwidth of 25.8%. Referring to FIG. 21B, the gain at the central frequency point (28 GHz) is 8.63 dBi. Referring to FIG. 21C, in the frequency range of 24 GHz to 30 GHz, a minimum value of gain is 7.74 dBi at a frequency point 24 GHz, and a maximum value of gain is 8.81 dBi at a frequency point 27 GHz. A variation range of the gain values is 1.07 dB.

As compared to the antenna depicted in FIG. 1A, the relative impedance bandwidth of the antenna depicted in FIG. 19A decreases; the gain at the central frequency point decreases; but the variation range of the gain values decreases. As compared to the antenna depicted in FIG. 16A, the relative impedance bandwidth of the antenna depicted in FIG. 19A increases; the gain at the central frequency point increases; and the variation range of the gain values decreases.

Comparing the antenna depicted in FIG. 19A with the antenna depicted in FIG. 16A, by having the included angles between extension directions of the slits and the longitudinal direction of the slot in certain ranges (e.g., 45 degrees and 135 degrees), and by having the included angles between the longitudinal direction of a slot and extension directions of first sides and second sides of the overall shape of the radiating plate in certain ranges (e.g., 45 degrees and 135 degrees), the performance of the antenna can be improved.

Figure 22A:
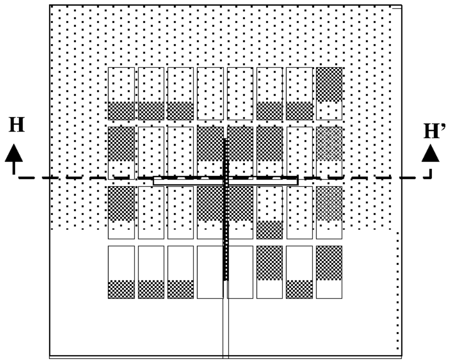
FIG. 22A is a plan view of an antenna in some embodiments according to the present disclosure.
Figure 22B:
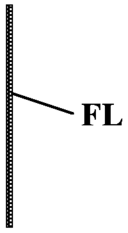
FIG. 22B illustrates the structure of a first conductive layer in an antenna depicted in FIG. 22A.
Figure 22C:
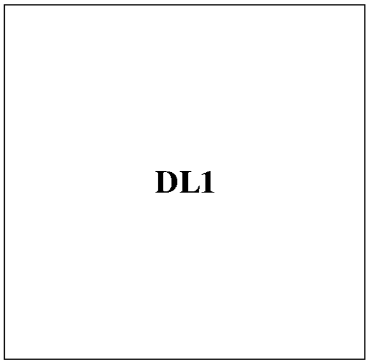
FIG. 22C illustrates the structure of a first dielectric layer in an antenna depicted in FIG. 22A.
Figure 22D:
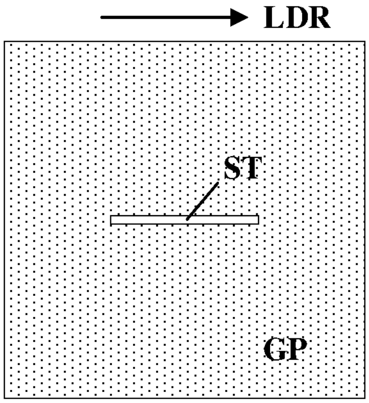
FIG. 22D illustrates the structure of a second conductive layer in an antenna depicted in FIG. 22A.
Figure 22E:
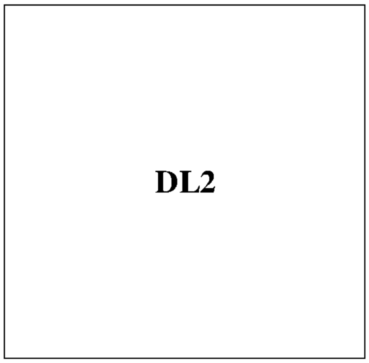
FIG. 22E illustrates the structure of a second dielectric layer in an antenna depicted in FIG. 22A.
Figure 22F:
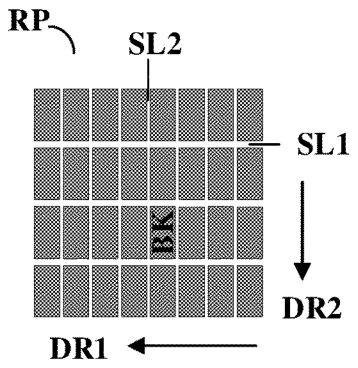
FIG. 22F illustrates the structure of a third conductive layer in an antenna depicted in FIG. 22A.
Figure 23:
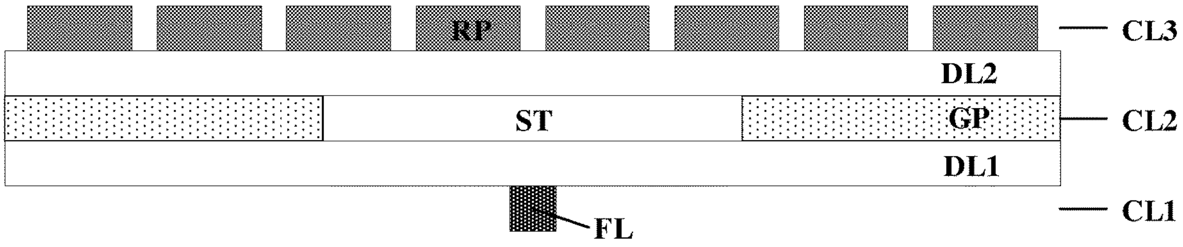
FIG. 23 is a cross-sectional view along an H-H' line in FIG. 22A.

FIG. 22A is a plan view of an antenna in some embodiments according to the present disclosure. FIG. 22B illustrates the structure of a first conductive layer in an antenna depicted in FIG. 22A. FIG. 22C illustrates the structure of a first dielectric layer in an antenna depicted in FIG. 22A. FIG. 22D illustrates the structure of a second conductive layer in an antenna depicted in FIG. 22A. FIG. 22E illustrates the structure of a second dielectric layer in an antenna depicted in FIG. 22A. FIG. 22F illustrates the structure of a third conductive layer in an antenna depicted in FIG. 22A. FIG. 23 is a cross-sectional view along an H-H' line in FIG. 22A. The antenna depicted in FIG. 22A to FIG. 22F differs from the antenna depicted in FIG. 10A to FIG. 10F in that the radiating plate RP is divided into twice as many columns. The antenna depicted in FIG. 22A to FIG. 22F has a same area as the antenna depicted in FIG. 10A to FIG. 10F. The antenna depicted in FIG. 10A to FIG. 10F has a radiating plate RP comprising four columns and four rows of radiating blocks, whereas the antenna depicted in FIG. 22A to FIG. 22F has a radiating plate RP comprising eight columns and four rows of radiating blocks. A total number of radiating blocks in the radiating plate RP in the antenna depicted in FIG. 22A to FIG. 22F is twice of that in the antenna depicted in FIG. 10A to FIG. 10F.

Because a total number of columns increases while a total number of rows remains the same, in some embodiments, inter-slit distances of the plurality of first slits SL1 are different from inter-slit distances of the plurality of second slits SL2. In one example as depicted in FIG. 22F, the inter-slit distances of the plurality of first slits SL1 are twice of the inter-slit distances of the plurality of second slits SL2.

Figure 24A:
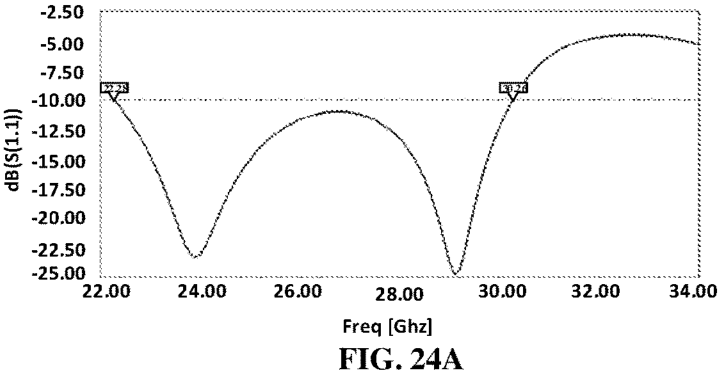
FIG. 24A illustrates an S11 graph of the antenna depicted in FIG. 22A.
Figure 24B:
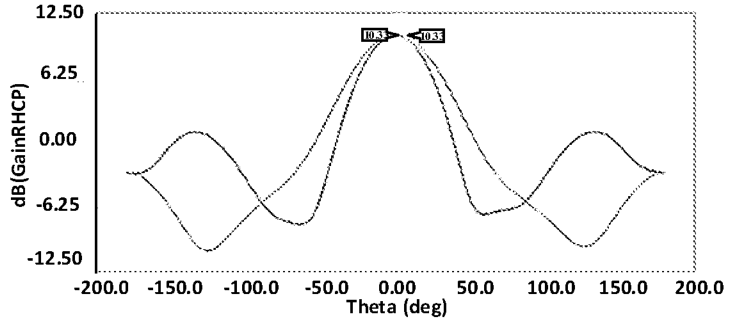
FIG. 24B illustrates a realized gain curve of the antenna depicted in FIG. 22A at a central frequency point.
Figure 24C:
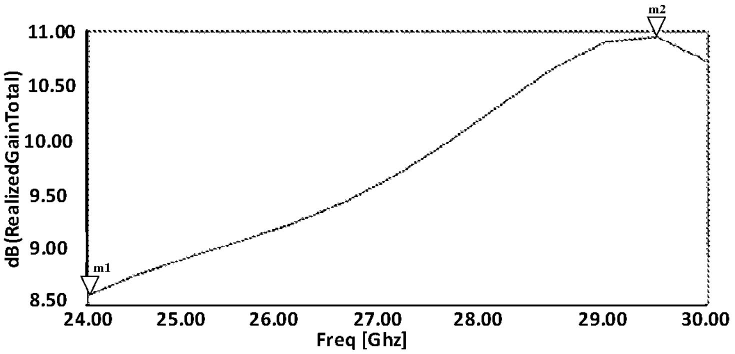
FIG. 24C illustrates a realized gain curve of the antenna depicted in FIG. 22A in a frequency range of 24 GHz to 30 GHz.

FIG. 24A illustrates an S11 graph of the antenna depicted in FIG. 22A. FIG. 24B illustrates a realized gain curve of the antenna depicted in FIG. 22A at a central frequency point. FIG. 24C illustrates a realized gain curve of the antenna depicted in FIG. 22A in a frequency range of 24 GHz to 30 GHz.

Referring to FIG. 24A, the antenna has a −10 dB impedance bandwidth of 7.98 GHz (ranging from 22.28 GHz to 30.26 GHz), with a relative bandwidth of 30.3%. Referring to FIG. 24B, the gain at the central frequency point (28 GHz) is 10.33 dBi. Referring to FIG. 24C, in the frequency range of 24 GHz to 30 GHz, a minimum value of gain is 8.54 dBi at a frequency point 24 GHz, and a maximum value of gain is 10.96 dBi at a frequency point 29.5 GHz. A variation range of the gain values is 2.42 dB.

As compared to the antenna depicted in FIG. 1A, the relative impedance bandwidth of the antenna depicted in FIG. 22A decreases; the gain at the central frequency point increases; and the variation range of the gain values increases. As compared to the antenna depicted in FIG. 16A, the relative impedance bandwidth of the antenna depicted in FIG. 22A increases; the gain at the central frequency point increases; and the variation range of the gain values increases. The comparison indicates that, while maintaining an area of the radiating plate substantially the same, increasing a total number of columns of radiating blocks, within a certain range, may further enhance the performance of the antenna.

Figure 25A:
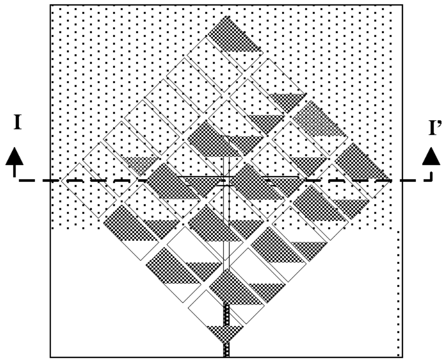
FIG. 25A is a plan view of an antenna in some embodiments according to the present disclosure.
Figure 25B:
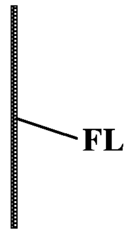
FIG. 25B illustrates the structure of a first conductive layer in an antenna depicted in FIG. 25A.
Figure 25C:
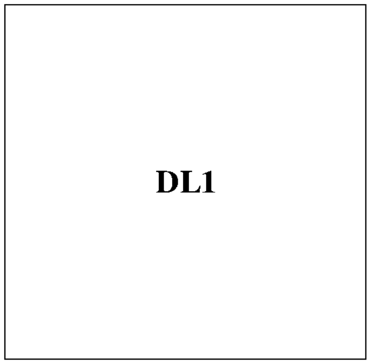
FIG. 25C illustrates the structure of a first dielectric layer in an antenna depicted in FIG. 25A.
Figure 25D:
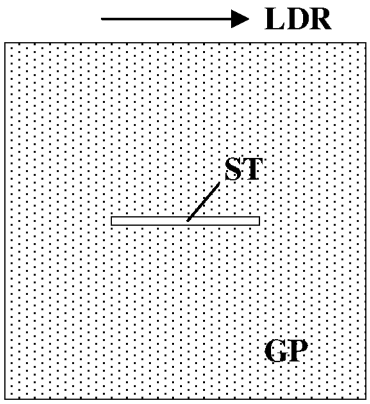
FIG. 25D illustrates the structure of a second conductive layer in an antenna depicted in FIG. 25A.
Figure 25E:
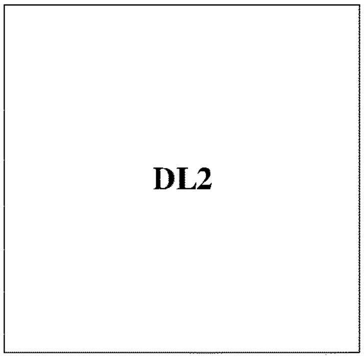
FIG. 25E illustrates the structure of a second dielectric layer in an antenna depicted in FIG. 25A.
Figure 25F:
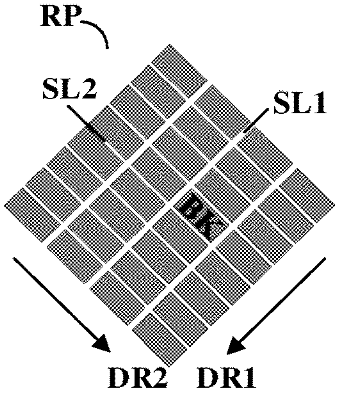
FIG. 25F illustrates the structure of a third conductive layer in an antenna depicted in FIG. 25A.

FIG. 25A is a plan view of an antenna in some embodiments according to the present disclosure. FIG. 25B illustrates the structure of a first conductive layer in an antenna depicted in FIG. 25A. FIG. 25C illustrates the structure of a first dielectric layer in an antenna depicted in FIG. 25A. FIG. 25D illustrates the structure of a second conductive layer in an antenna depicted in FIG. 25A. FIG. 25E illustrates the structure of a second dielectric layer in an antenna depicted in FIG. 25A. FIG. 25F illustrates the structure of a third conductive layer in an antenna depicted in FIG. 25A.

Comparing the antenna depicted in FIG. 25A with the antenna depicted in FIG. 22A, extension directions of the slits relative to the longitudinal direction of the slot in the antenna depicted in FIG. 25A are different from those in the antenna depicted in FIG. 22A. Referring to FIG. 25A, FIG. 25D, FIG. 25F, and FIG. 26B, a respective one of the plurality of first slits SL1 extend substantially along a first direction DR1. A respective one of the plurality of second slits SL2 extend substantially along a second direction SR2, the second direction DR2 being different from the first direction DR1. The longitudinal direction LDR of the slot ST has a first included angle α1 with respect to the first direction DR1, and a second included angle α2 with respect to the second direction DR2. In the antenna depicted in FIG. 25A, the first included angle α1 is in a range of 35 degrees to 55 degrees (e.g., 35 degrees to 40 degrees, 40 degrees to 45 degrees, 45 degrees to 50 degrees, or 50 degrees to 55 degrees,); and the second included angle α2 is in a range of 125 degrees to 145 degrees (e.g., 125 degrees to 130 degrees, 130 degrees to 135 degrees, 135 degrees to 140 degrees, or 140 degrees to 145 degrees). In one example, the first included angle α1 is 45 degrees, and the second included angle α2 is 135 degrees.

Comparing the antenna depicted in FIG. 25A with the antenna depicted in FIG. 22A, the orientation of the radiating plate relative to the ground plate in the antenna depicted in FIG. 25A is different from those in the antenna depicted in FIG. 22A. Referring to FIG. 25A, FIG. 25D, FIG. 25F, and FIG. 26B, the radiating plate RP has an overall polygonal shape (e.g., a square shape) having first sides S1 extending along the first direction DR1 and second sides S2 extending along a second direction DR2. The longitudinal direction LDR of the slot ST has a first included angle α1 with respect to the first direction DR1, and a second included angle α2 with respect to the second direction DR2. In the antenna depicted in FIG. 25A, the first included angle α1 is in a range of 35 degrees to 55 degrees (e.g., 35 degrees to 40 degrees, 40 degrees to 45 degrees, 45 degrees to 50 degrees, or 50 degrees to 55 degrees,); and the second included angle α2 is in a range of 125 degrees to 145 degrees (e.g., 125 degrees to 130 degrees, 130 degrees to 135 degrees, 135 degrees to 140 degrees, or 140 degrees to 145 degrees). In one example, the first included angle α1 is 45 degrees, and the second included angle α2 is 135 degrees.

Figure 26A:
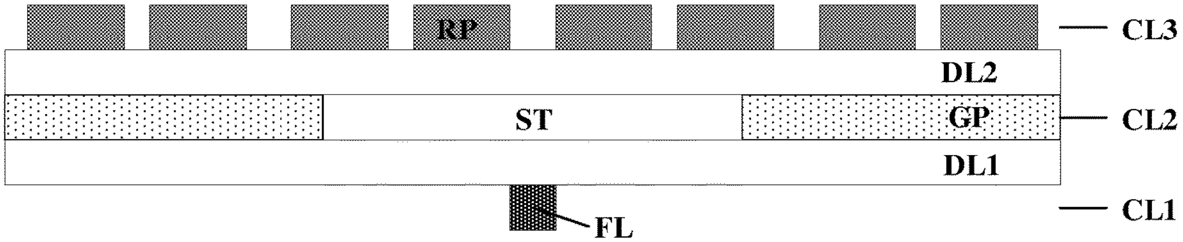
FIG. 26A is a cross-sectional view along an I-I' line in FIG. 25A.
Figure 26B:
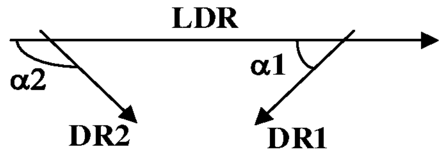
FIG. 26B illustrates included angles between a longitudinal direction of a slot and extension directions of slits in some embodiments according to the present disclosure.
Figure 26C:
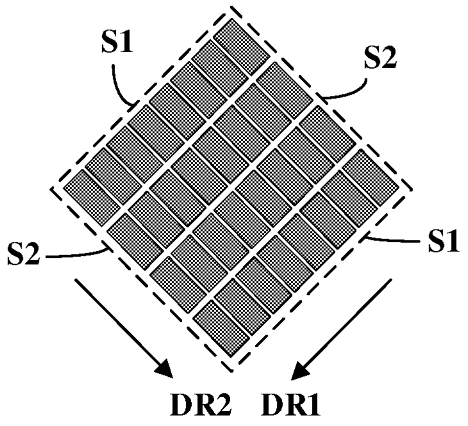
FIG. 26C illustrates an overall shape of a radiating plate of the antenna depicted in FIG. 25A.

FIG. 26A is a cross-sectional view along an I-I' line in FIG. 25A. FIG. 26B illustrates included angles between a longitudinal direction of a slot and extension directions of slits in some embodiments according to the present disclosure. FIG. 26C illustrates an overall shape of a radiating plate of the antenna depicted in FIG. 25A.

Figure 27A:
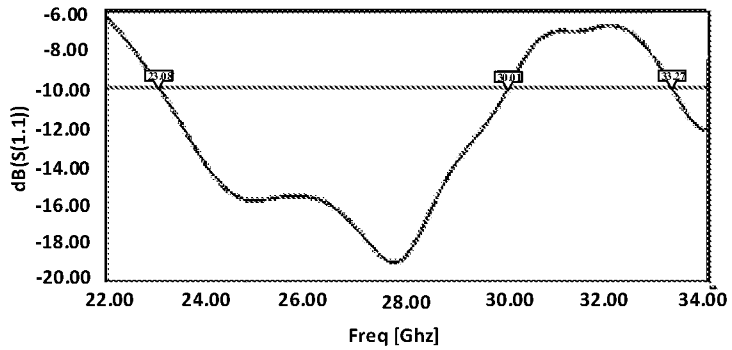
FIG. 27A illustrates an S11 graph of the antenna depicted in FIG. 25A.
Figure 27B:
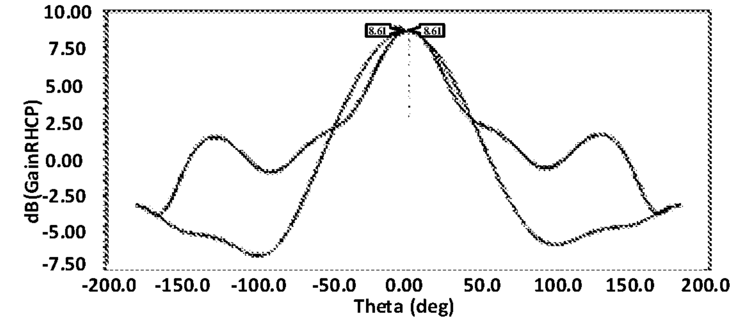
FIG. 27B illustrates a realized gain curve of the antenna depicted in FIG. 25A at a central frequency point.
Figure 27C:
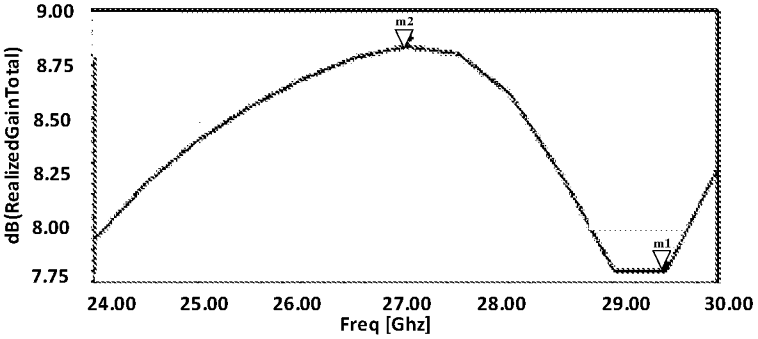
FIG. 27C illustrates a realized gain curve of the antenna depicted in FIG. 25A in a frequency range of 24 GHz to 30 GHz.

FIG. 27A illustrates an S11 graph of the antenna depicted in FIG. 25A. FIG. 27B illustrates a realized gain curve of the antenna depicted in FIG. 25A at a central frequency point. FIG. 27C illustrates a realized gain curve of the antenna depicted in FIG. 25A in a frequency range of 24 GHz to 30 GHz.

Referring to FIG. 27A, the antenna has a −10 dB impedance bandwidth of 6.93 GHz (ranging from 23.08 GHz to 30.01 GHz), with a relative bandwidth of 26.1%. Referring to FIG. 27B, the gain at the central frequency point (28 GHz) is 8.61 dBi. Referring to FIG. 27C, in the frequency range of 24 GHz to 30 GHz, a minimum value of gain is 7.79 dBi at a frequency point 29.5 GHz, and a maximum value of gain is 8.83 dBi at a frequency point 27 GHz. A variation range of the gain values is 1.04 dB.

As compared to the antenna depicted in FIG. 1A, the relative impedance bandwidth of the antenna depicted in FIG. 25A decreases; the gain at the central frequency point decreases; but the variation range of the gain values decreases. As compared to the antenna depicted in FIG. 22A, the relative impedance bandwidth of the antenna depicted in FIG. 25A decreases; the gain at the central frequency point decreases; but the variation range of the gain values decreases.

Comparing the antenna depicted in FIG. 25A with the antenna depicted in FIG. 22A, by having the included angles between extension directions of the slits and the longitudinal direction of the slot in certain ranges (e.g., 45 degrees and 135 degrees), and by having the included angles between the longitudinal direction of a slot and extension directions of first sides and second sides of the overall shape of the radiating plate in certain ranges (e.g., 45 degrees and 135 degrees), the variation range of the gain values can be adjusted.

Figure 28A:
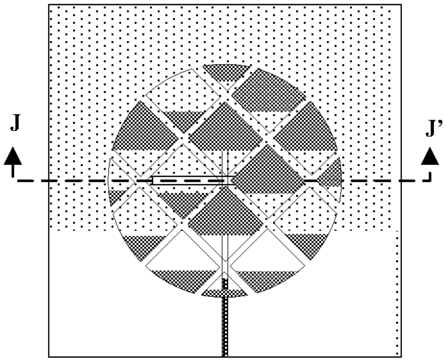
FIG. 28A is a plan view of an antenna in some embodiments according to the present disclosure.
Figure 28B:
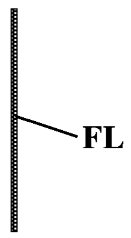
FIG. 28B illustrates the structure of a first conductive layer in an antenna depicted in FIG. 28A.
Figure 28C:
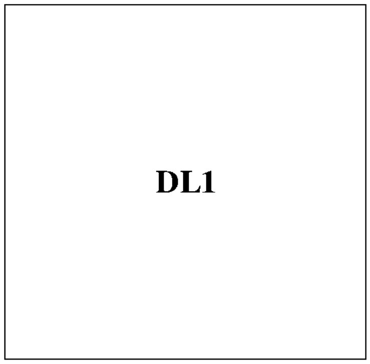
FIG. 28C illustrates the structure of a first dielectric layer in an antenna depicted in FIG. 28A.
Figure 28D:
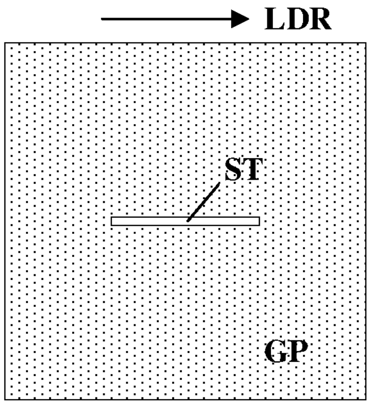
FIG. 28D illustrates the structure of a second conductive layer in an antenna depicted in FIG. 28A.
Figure 28E:
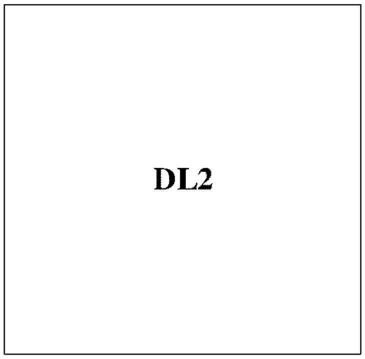
FIG. 28E illustrates the structure of a second dielectric layer in an antenna depicted in FIG. 28A.
Figure 28F:
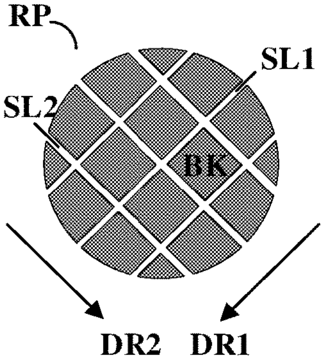
FIG. 28F illustrates the structure of a third conductive layer in an antenna depicted in FIG. 28A.
Figure 29A:
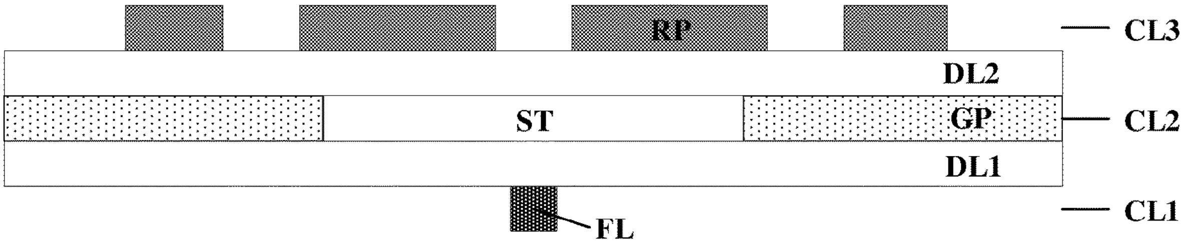
FIG. 29A is a cross-sectional view along a J-J' line in FIG. 28A.

FIG. 28A is a plan view of an antenna in some embodiments according to the present disclosure. FIG. 28B illustrates the structure of a first conductive layer in an antenna depicted in FIG. 28A. FIG. 28C illustrates the structure of a first dielectric layer in an antenna depicted in FIG. 28A. FIG. 28D illustrates the structure of a second conductive layer in an antenna depicted in FIG. 28A. FIG. 28E illustrates the structure of a second dielectric layer in an antenna depicted in FIG. 28A. FIG. 28F illustrates the structure of a third conductive layer in an antenna depicted in FIG. 28A. FIG. 29A is a cross-sectional view along a J-J' line in FIG. 28A.

Figure 29B:
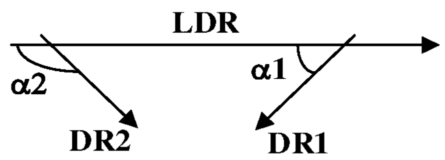
FIG. 29B illustrates included angles between a longitudinal direction of a slot and extension directions of slits in some embodiments according to the present disclosure.

FIG. 29B illustrates included angles between a longitudinal direction of a slot and extension directions of slits in some embodiments according to the present disclosure. The antenna depicted in FIG. 28A to FIG. 28F differs from the antenna depicted in FIG. 1A to FIG. 1F in that a combination of the plurality of radiating blocks in the radiating plate RP has an overall circular shape. The radiating plate RP has an overall circular shape.

Figure 30A:
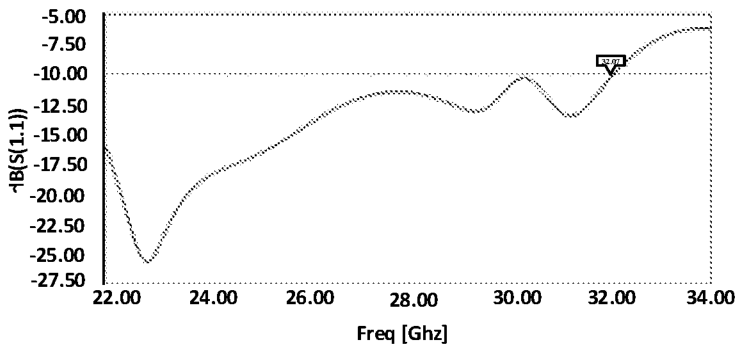
FIG. 30A illustrates an S11 graph of the antenna depicted in FIG. 28A.
Figure 30B:
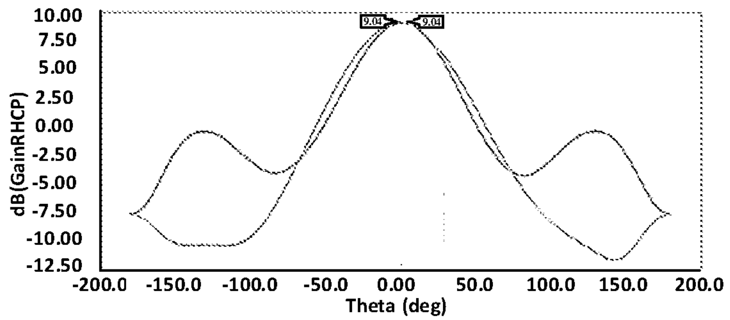
FIG. 30B illustrates a realized gain curve of the antenna depicted in FIG. 28A at a central frequency point.
Figure 30C:
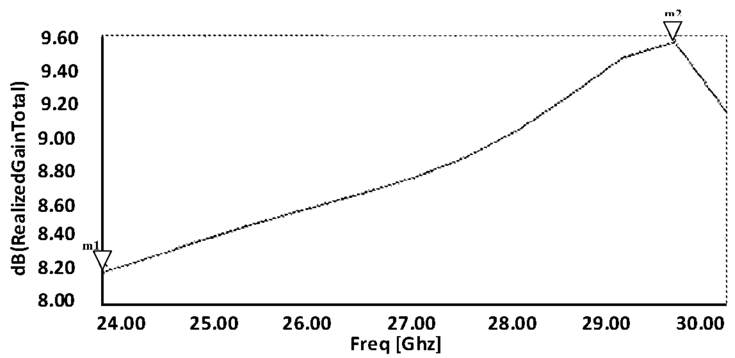
FIG. 30C illustrates a realized gain curve of the antenna depicted in FIG. 28A in a frequency range of 24 GHz to 30 GHz.

FIG. 30A illustrates an S11 graph of the antenna depicted in FIG. 28A. FIG. 30B illustrates a realized gain curve of the antenna depicted in FIG. 28A at a central frequency point. FIG. 30C illustrates a realized gain curve of the antenna depicted in FIG. 28A in a frequency range of 24 GHz to 30 GHz.

Referring to FIG. 30A, the antenna has a −10 dB impedance bandwidth of 10.07 GHz (ranging from 22 GHz to 32.07 GHz), with a relative bandwidth of 37.2%. Referring to FIG. 30B, the gain at the central frequency point (28 GHz) is 9.04 dBi. Referring to FIG. 30C, in the frequency range of 24 GHz to 30 GHz, a minimum value of gain is 8.19 dBi at a frequency point 24 GHz, and a maximum value of gain is 9.56 dBi at a frequency point 29.5 GHz. A variation range of the gain values is 1.37 dB.

As compared to the antenna depicted in FIG. 1A, the relative impedance bandwidth of the antenna depicted in FIG. 28A increases; the gain at the central frequency point decreases; but the variation range of the gain values decreases.

Figure 31A:
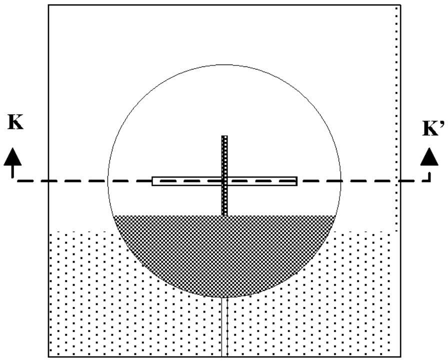
FIG. 31A is a plan view of an antenna in some embodiments according to the present disclosure.
Figure 31B:
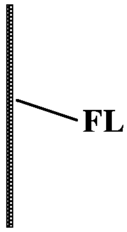
FIG. 31B illustrates the structure of a first conductive layer in an antenna depicted in FIG. 31A.
Figure 31C:
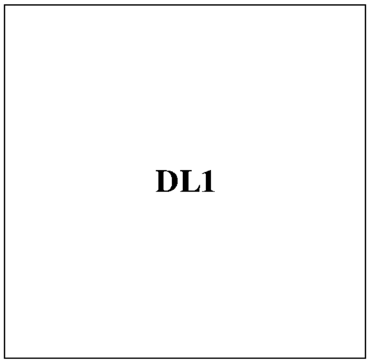
FIG. 31C illustrates the structure of a first dielectric layer in an antenna depicted in FIG. 31A.
Figure 31D:
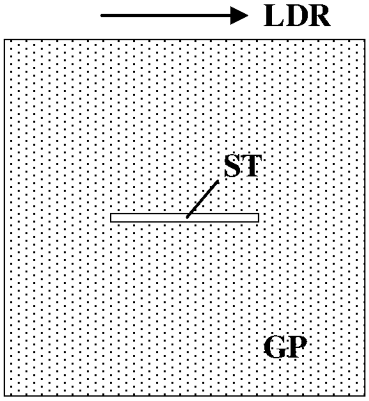
FIG. 31D illustrates the structure of a second conductive layer in an antenna depicted in FIG. 31A.
Figure 31E:
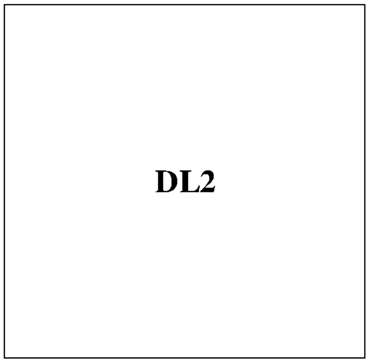
FIG. 31E illustrates the structure of a second dielectric layer in an antenna depicted in FIG. 31A.
Figure 31F:
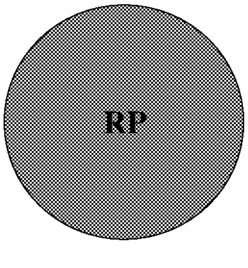
FIG. 31F illustrates the structure of a third conductive layer in an antenna depicted in FIG. 31A.
Figure 32:
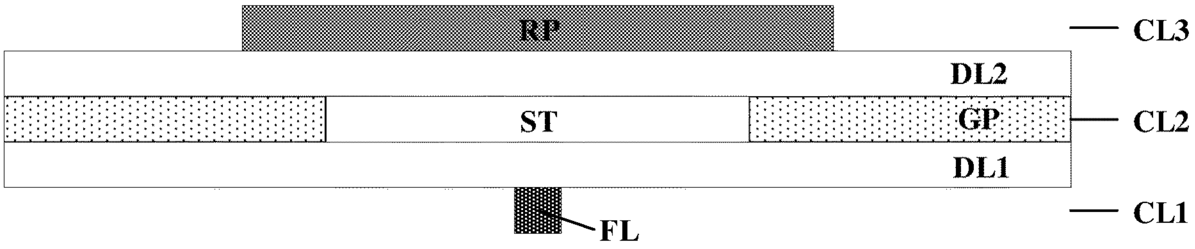

FIG. 31A is a plan view of an antenna in some embodiments according to the present disclosure. FIG. 31B illustrates the structure of a first conductive layer in an antenna depicted in FIG. 31A. FIG. 31C illustrates the structure of a first dielectric layer in an antenna depicted in FIG. 31A. FIG. 31D illustrates the structure of a second conductive layer in an antenna depicted in FIG. 31A. FIG. 31E illustrates the structure of a second dielectric layer in an antenna depicted in FIG. 31A. FIG. 31F illustrates the structure of a third conductive layer in an antenna depicted in FIG. 31A. FIG. 32 is a cross-sectional view along a K-K' line in FIG. 31A. Referring to FIG. 31A to FIG. 31F, and FIG. 32, the radiating plate RP in some embodiments is a unitary structure, e.g., without being divided into a plurality of radiating blocks.

Figure 33A:
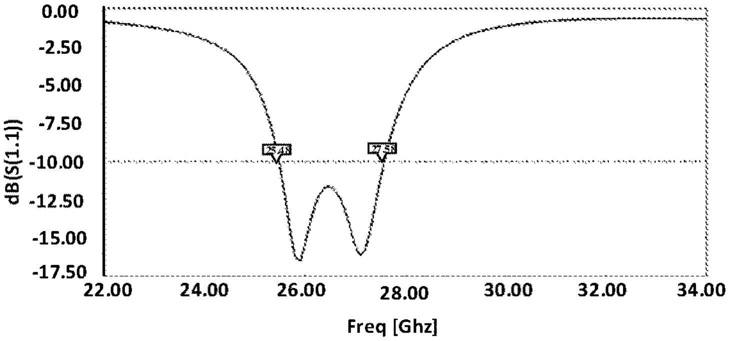
Figure 33B:
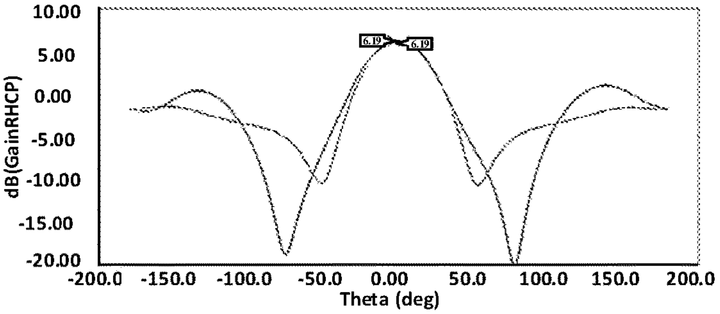
Figure 33C:
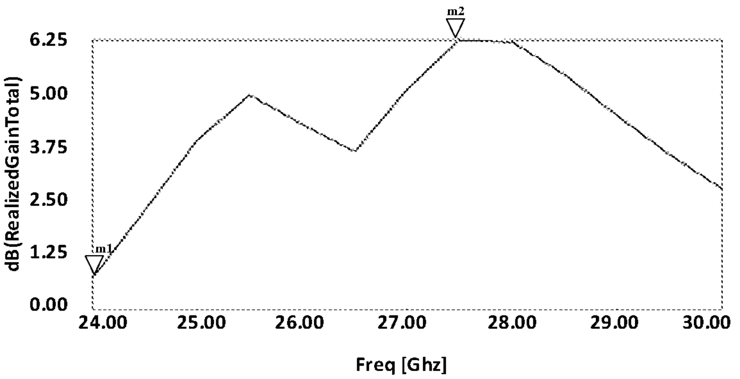

FIG. 33A illustrates an S11 graph of the antenna depicted in FIG. 31A. FIG. 33B illustrates a realized gain curve of the antenna depicted in FIG. 31A at a central frequency point. FIG. 33C illustrates a realized gain curve of the antenna depicted in FIG. 31A in a frequency range of 24 GHz to 30 GHz. Referring to FIG. 33A, the antenna has a −10 dB impedance bandwidth of 2.1 GHz (ranging from 25.48 GHz to 27.58 GHz), with a relative bandwidth of 7.9%. Referring to FIG. 33B, the gain at the central frequency point (28 GHz) is 6.19 dBi. Referring to FIG. 33C, in the frequency range of 24 GHz to 30 GHz, a minimum value of gain is 0.74 dBi at a frequency point 24 GHz, and a maximum value of gain is 6.24 dBi at a frequency point 27.5 GHz. A variation range of the gain values is 5.5 dB. As compared to the antenna depicted in FIG. 31A, the relative impedance bandwidth of the antenna depicted in FIG. 31A deteriorates significantly; the gain at the central frequency point decreases; and the variation range of the gain values increases.

By dividing the radiating plate into a plurality of radiating blocks, having the included angles between the longitudinal direction of a slot and extension directions of slits in certain ranges, and having the included angles between the longitudinal direction of a slot and extension directions of first sides and second sides of the overall shape of the radiating plate in certain ranges, the performance of the antenna can be significantly improved without the need for an additional feed network to improve the antenna gain.

The antenna depicted in FIG. 31A differs from the antenna depicted in FIG. 4A in that a combination of the plurality of radiating blocks in the radiating plate RP has an overall circular shape. As compared to the antenna depicted in FIG. 4A, the relative impedance bandwidth of the antenna depicted in FIG. 31A increases; the gain at the central frequency point decreases; and the variation range of the gain values decreases.

Figure 34B:
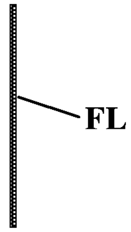
Figure 34C:
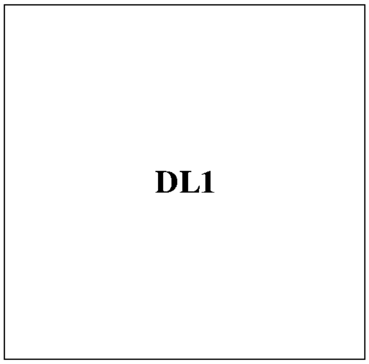
Figure 34D:
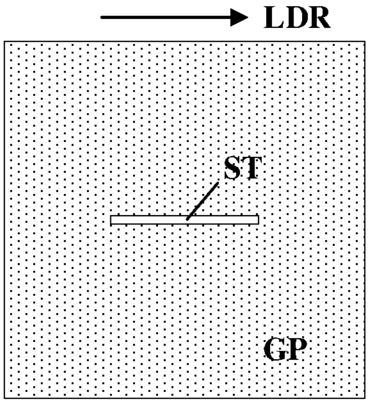
Figure 34E:
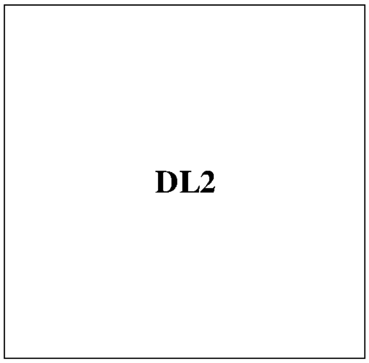
Figure 34F:
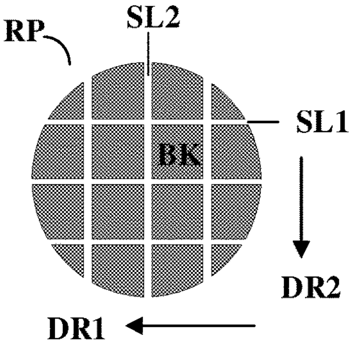
Figure 35A:
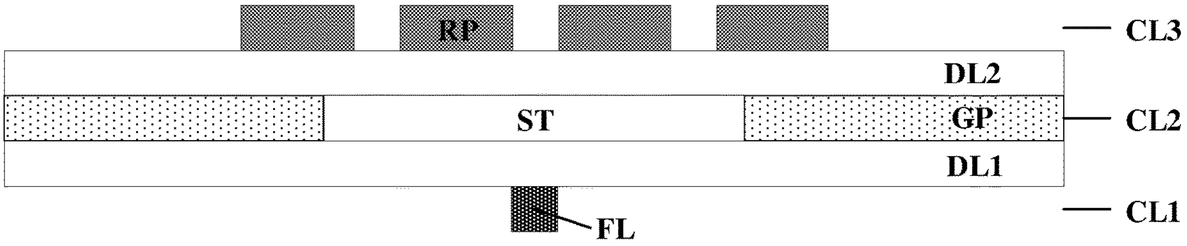
Figure 35B:
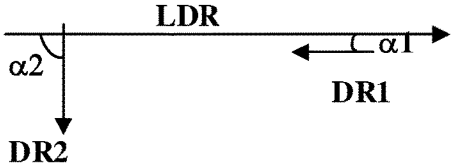

FIG. 34A is a plan view of an antenna in some embodiments according to the present disclosure. FIG. 34B illustrates the structure of a first conductive layer in an antenna depicted in FIG. 34A. FIG. 34C illustrates the structure of a first dielectric layer in an antenna depicted in FIG. 34A. FIG. 34D illustrates the structure of a second conductive layer in an antenna depicted in FIG. 34A. FIG. 34E illustrates the structure of a second dielectric layer in an antenna depicted in FIG. 34A. FIG. 34F illustrates the structure of a third conductive layer in an antenna depicted in FIG. 34A. FIG. 35A is a cross-sectional view along a L-L' line in FIG. 34A. FIG. 35B illustrates included angles between a longitudinal direction of a slot and extension directions of slits in some embodiments according to the present disclosure. The antenna depicted in FIG. 34A to FIG. 34F differs from the antenna depicted in FIG. 10A to FIG. 10F in that a combination of the plurality of radiating blocks in the radiating plate RP has an overall circular shape. The radiating plate RP has an overall circular shape.

Comparing the antenna depicted in FIG. 34A with the antenna depicted in FIG. 28A, extension directions of the slits relative to the longitudinal direction of the slot in the antenna depicted in FIG. 34A are different from those in the antenna depicted in FIG. 28A. Referring to FIG. 34A, FIG. 34D, FIG. 34F, and FIG. 35, a respective one of the plurality of first slits SL1 extend substantially along a first direction DR1. A respective one of the plurality of second slits SL2 extend substantially along a second direction SR2, the second direction DR2 being different from the first direction DR1. The longitudinal direction LDR of the slot ST has a first included angle $\alpha 1$ with respect to the first direction DR1, and a second included angle $\alpha 2$ with respect to the second direction DR2. In the antenna depicted in FIG. 34A, the first included angle $\alpha 1$ is in a range of −10 degrees to 10 degrees (e.g., −10 degrees to −5 degrees, −5 degrees to 0 degrees, 0 degrees to 5 degrees, or 5 degrees to 10 degrees), and the second included angle $\alpha 2$ is in a range of 80 degrees to 100 degrees (e.g., 80 degrees to 85 degrees, 85 degrees to 90 degrees, 90 degrees to 95 degrees, 95 degrees to 100 degrees). In one example as depicted in FIG. 35B, the first included angle $\alpha 1$ is 0 degrees, and the second included angle $\alpha 2$ is 90 degrees. In another example as depicted in FIG. 2B, the first included angle $\alpha 1$ is 45 degrees, and the second included angle $\alpha 2$ is 135 degrees.

FIG. 36A illustrates an S11 graph of the antenna depicted in FIG. 34A. FIG. 36B illustrates a realized gain curve of the antenna depicted in FIG. 34A at a central frequency point. FIG. 36C illustrates a realized gain curve of the antenna depicted in FIG. 34A in a frequency range of 24 GHz to 30 GHz.

Referring to FIG. 36A, the antenna has a −10 dB impedance bandwidth of 10.33 GHz (ranging from 23.54 GHz to 33.87 GHz), with a relative bandwidth of 35.9%. Referring to FIG. 36B, the gain at the central frequency point (28 GHz) is 8.69 dBi. Referring to FIG. 36C, in the frequency range of 24 GHz to 30 GHz, a minimum value of gain is 7.46 dBi at a frequency point 24 GHz, and a maximum value of gain is 9.34 dBi at a frequency point 30 GHz. A variation range of the gain values is 1.88 dB. As compared to the antenna depicted in FIG. 28A, the relative impedance bandwidth of the antenna depicted in FIG. 34A decreases; the gain at the central frequency point decreases; and the variation range of the gain values increases.

Comparing the antenna depicted in FIG. 34A with the antenna depicted in FIG. 28A, by having the included angles between extension directions of the slits and the longitudinal direction of the slot (e.g., 45 degrees and 135 degrees), the performance of the antenna can be improved.

Comparing the antenna depicted in FIG. 34A with the antenna depicted in FIG. 31A, by having the radiating plate made of a plurality of radiating blocks, the performance of the antenna can be significantly improved.

FIG. 37A is a plan view of an antenna in some embodiments according to the present disclosure. FIG. 37B illustrates the structure of a first conductive layer in an antenna depicted in FIG. 37A. FIG. 37C illustrates the structure of a first dielectric layer in an antenna depicted in FIG. 37A. FIG. 37D illustrates the structure of a second conductive layer in an antenna depicted in FIG. 37A. FIG. 37E illustrates the structure of a second dielectric layer in an antenna depicted in FIG. 37A. FIG. 37F illustrates the structure of a third conductive layer in an antenna depicted in FIG. 37A. FIG. 38 is a cross-sectional view along a M-M' line in FIG. 37A. Referring to FIG. 37A to FIG. 37F, and FIG. 38, the radiating plate RP in some embodiments is a unitary structure, e.g., without being divided into a plurality of radiating blocks.

The antenna depicted in FIG. 37A to FIG. 37F differs from the antenna depicted in FIG. 31A and the antenna depicted in FIG. 4A in that a combination of the plurality of radiating blocks has an overall cross shape. The radiating plate RP has an overall cross shape.

FIG. 39A illustrates an S11 graph of the antenna depicted in FIG. 37A. FIG. 39B illustrates a realized gain curve of the antenna depicted in FIG. 37A at a central frequency point. FIG. 39C illustrates a realized gain curve of the antenna depicted in FIG. 37A in a frequency range of 24 GHz to 30 GHz. Referring to FIG. 39A, the antenna has a −10 dB impedance bandwidth of 0.44 GHz (ranging from 23.80 GHz to 24.24 GHz), with a relative bandwidth of 1.8%. Referring to FIG. 39B, the gain at the central frequency point (28 GHz) is 7.71 dBi. Referring to FIG. 39C, in the frequency range of 24 GHz to 30 GHz, a minimum value of gain is 2.78 dBi at a frequency point 25 GHz, and a maximum value of gain is 8.97 dBi at a frequency point 29 GHz. A variation range of the gain values is 6.19 dB. As compared to the antenna depicted in FIG. 28A, the relative impedance bandwidth of the antenna depicted in FIG. 37A deteriorates significantly; the gain at the central frequency point decreases; and the variation range of the gain values increases.

By dividing the radiating plate into a plurality of radiating blocks, having the included angles between the longitudinal direction of a slot and extension directions of slits in certain ranges, and having the included angles between the longitudinal direction of a slot and extension directions of first sides and second sides of the overall shape of the radiating plate in certain ranges, the performance of the antenna can be significantly improved without the need for an additional feed network to improve the antenna gain.

As compared to the antenna depicted in FIG. 31A, the relative impedance bandwidth of the antenna depicted in FIG. 37A decreases; the gain at the central frequency point increases; and the variation range of the gain values increases. As compared to the antenna depicted in FIG. 4A, the relative impedance bandwidth of the antenna depicted in FIG. 37A increases; the gain at the central frequency point decreases; and the variation range of the gain values decreases. Thus, the antenna in which a combination of the plurality of radiating blocks has an overall circular shape has a better performance than to the antenna in which a combination of the plurality of radiating blocks has an overall cross shape, and the antenna in which a combination of the plurality of radiating blocks has an overall cross shape has a better performance than to the antenna in which a combination of the plurality of radiating blocks has an overall square shape.

FIG. 40A is a plan view of an antenna in some embodiments according to the present disclosure. FIG. 40B illustrates the structure of a first conductive layer in an antenna depicted in FIG. 40A. FIG. 40C illustrates the structure of a first dielectric layer in an antenna depicted in FIG. 40A. FIG. 40D illustrates the structure of a second conductive layer in an antenna depicted in FIG. 40A. FIG. 40E illustrates the structure of a second dielectric layer in an antenna depicted in FIG. 40A. FIG. 40F illustrates the structure of a third conductive layer in an antenna depicted in FIG. 40A. Referring to FIG. 40A to FIG. 40F, the radiating plate RP in some embodiments is a unitary structure, e.g., without being divided into a plurality of radiating blocks.

FIG. 41A is a cross-sectional view along an N-N' line in FIG. 40A. FIG. 41B illustrates an overall shape of a radiating plate of the antenna depicted in FIG. 40A. FIG. 41C illustrates included angles between a longitudinal direction of a slot and extension directions of first sides and second sides of an overall shape of a radiating plate in some embodiments according to the present disclosure. Referring to FIG. 41B and FIG. 41C, the radiating plate RP has an overall polygonal shape (e.g., a cross shape) having first sides S1 extending along the first direction DR1 and second sides S2 extending along a second direction DR2. The longitudinal direction LDR of the slot ST has a first included angle $\alpha 1$ with respect to the first direction DR1, and a second included angle $\alpha 2$ with respect to the second direction DR2. The first included angle $\alpha 1$ is in a range of 35 degrees to 55 degrees (e.g., 35 degrees to 40 degrees, 40 degrees to 45 degrees, 45 degrees to 50 degrees, or 50 degrees to 55 degrees,); and the second included angle $\alpha 2$ is in a range of 125 degrees to 145 degrees (e.g., 125 degrees to 130 degrees, 130 degrees to 135 degrees, 135 degrees to 140 degrees, or 140 degrees to 145 degrees). In one example depicted in FIG. 41C, the first included angle $\alpha 1$ is 45 degrees, and the second included angle $\alpha 2$ is 135 degrees.

FIG. 42A illustrates an S11 graph of the antenna depicted in FIG. 40A. FIG. 42B illustrates a realized gain curve of the antenna depicted in FIG. 40A at a central frequency point. FIG. 42C illustrates a realized gain curve of the antenna depicted in FIG. 40A in a frequency range of 24 GHz to 30 GHz.

Referring to FIG. 42A, the antenna has a −10 dB impedance bandwidth of 0.84 GHz (ranging from 26.70 GHz to 27.54 GHz), with a relative bandwidth of 3.0%. Referring to FIG. 42B, the gain at the central frequency point (28 GHz) is 7.38 dBi. Referring to FIG. 42C, in the frequency range of 24 GHz to 30 GHz, a minimum value of gain is −3.45 dBi at a frequency point 24 GHz, and a maximum value of gain is 8.12 dBi at a frequency point 27.5 GHz. A variation range of the gain values is 11.57 dB. As compared to the antenna depicted in FIG. 28A, the relative impedance bandwidth of the antenna depicted in FIG. 40A deteriorates significantly; the gain at the central frequency point decreases; and the variation range of the gain values increases significantly. As compared to the antenna depicted in FIG. 37A, the relative impedance bandwidth of the antenna depicted in FIG. 40A increases, the gain at the central frequency point decreases, and the variation range of the gain values increases significantly.

Comparing the antenna depicted in FIG. 37A with the antenna depicted in FIG. 40A, by having the included angles between the longitudinal direction of a slot and extension directions of first sides and second sides of the overall shape of the radiating plate in certain ranges (e.g., 45 degrees and 135 degrees), the performance of the antenna can be improved.

FIG. 43A is a plan view of an antenna in some embodiments according to the present disclosure. FIG. 43B illustrates the structure of a first conductive layer in an antenna depicted in FIG. 43A. FIG. 43C illustrates the structure of a first dielectric layer in an antenna depicted in FIG. 43A. FIG.

43D illustrates the structure of a second conductive layer in an antenna depicted in FIG. 43A. FIG. 43E illustrates the structure of a second dielectric layer in an antenna depicted in FIG. 43A. FIG. 43F illustrates the structure of a third conductive layer in an antenna depicted in FIG. 43A. The antenna depicted in FIG. 43A to FIG. 43F differs from the antenna depicted in FIG. 37A to FIG. 37F in that the radiating plate RP includes a plurality of radiating blocks BK.

FIG. 44A is a cross-sectional view along a O-O' line in FIG. 43A. FIG. 44B illustrates included angles between a longitudinal direction of a slot and extension directions of slits in some embodiments according to the present disclosure. FIG. 44C illustrates an overall shape of a radiating plate of the antenna depicted in FIG. 43A.

Comparing the antenna depicted in FIG. 43A with the antenna depicted in FIG. 37A, extension directions of the slits relative to the longitudinal direction of the slot in the antenna depicted in FIG. 44A are different from those in the antenna depicted in FIG. 37A. Referring to FIG. 43A, FIG. 43D, FIG. 43F, and FIG. 44B, a respective one of the plurality of first slits SL1 extend substantially along a first direction DR1. A respective one of the plurality of second slits SL2 extend substantially along a second direction SR2, the second direction DR2 being different from the first direction DR1. The longitudinal direction LDR of the slot ST has a first included angle $\alpha 1$ with respect to the first direction DR1, and a second included angle $\alpha 2$ with respect to the second direction DR2. In the antenna depicted in FIG. 43A, the first included angle $\alpha 1$ is in a range of −10 degrees to 10 degrees (e.g., −10 degrees to −5 degrees, −5 degrees to 0 degrees, 0 degrees to 5 degrees, or 5 degrees to 10 degrees), and the second included angle $\alpha 2$ is in a range of 80 degrees to 100 degrees (e.g., 80 degrees to 85 degrees, 85 degrees to 90 degrees, 90 degrees to 95 degrees, or 95 degrees to 100 degrees). In one example as depicted in FIG. 44B, the first included angle $\alpha 1$ is 0 degrees, and the second included angle $\alpha 2$ is 90 degrees.

Comparing the antenna depicted in FIG. 43A with the antenna depicted in FIG. 37A, the orientation of the radiating plate relative to the ground plate in the antenna depicted in FIG. 43A is different from those in the antenna depicted in FIG. 37A. Referring to FIG. 43A, FIG. 43D, FIG. 43F, and FIG. 44B, the radiating plate RP has an overall polygonal shape (e.g., a cross shape) having first sides S1 extending along the first direction DR1 and second sides S2 extending along a second direction DR2. The longitudinal direction LDR of the slot ST has a first included angle $\alpha 1$ with respect to the first direction DR1, and a second included angle $\alpha 2$ with respect to the second direction DR2. In the antenna depicted in FIG. 43A, the first included angle $\alpha 1$ is in a range of −10 degrees to 10 degrees (e.g., −10 degrees to −5 degrees, −5 degrees to 0 degrees, 0 degrees to 5 degrees, or 5 degrees to 10 degrees), and the second included angle $\alpha 2$ is in a range of 80 degrees to 100 degrees (e.g., 80 degrees to 85 degrees, 85 degrees to 90 degrees, 90 degrees to 95 degrees, or 95 degrees to 100 degrees). In one example as depicted in FIG. 44B, the first included angle $\alpha 1$ is 0 degrees, and the second included angle $\alpha 2$ is 90 degrees.

FIG. 45A illustrates an S11 graph of the antenna depicted in FIG. 43A. FIG. 45B illustrates a realized gain curve of the antenna depicted in FIG. 43A at a central frequency point. FIG. 45C illustrates a realized gain curve of the antenna depicted in FIG. 43A in a frequency range of 24 GHz to 30 GHz.

Referring to FIG. 45A, the antenna has a −10 dB impedance bandwidth of 9.58 GHz (ranging from 23.04 GHz to 32.62 GHz), with a relative bandwidth of 34.4%. Referring to FIG. 45B, the gain at the central frequency point (28 GHz) is 9.18 dBi. Referring to FIG. 45C, in the frequency range of 24 GHz to 30 GHz, a minimum value of gain is 7.95 dBi at a frequency point 24 GHz, and a maximum value of gain is 10.20 dBi at a frequency point 30 GHz. A variation range of the gain values is 2.25 dB. As compared to the antenna depicted in FIG. 28A, the relative impedance bandwidth of the antenna depicted in FIG. 43A decreases; the gain at the central frequency point decreases significantly; and the variation range of the gain values increases significantly.

As compared to the antenna depicted in FIG. 37A, the relative impedance bandwidth of the antenna depicted in FIG. 43A increases significantly; the gain at the central frequency point increases significantly; and the variation range of the gain values decreases significantly. By dividing the radiating plate into a plurality of radiating blocks, the performance of the antenna can be significantly improved without the need for an additional feed network to improve the antenna gain.

FIG. 46A is a plan view of an antenna in some embodiments according to the present disclosure. FIG. 46B illustrates the structure of a first conductive layer in an antenna depicted in FIG. 46A. FIG. 46C illustrates the structure of a first dielectric layer in an antenna depicted in FIG. 46A. FIG. 46D illustrates the structure of a second conductive layer in an antenna depicted in FIG. 46A. FIG. 46E illustrates the structure of a second dielectric layer in an antenna depicted in FIG. 46A. FIG. 46F illustrates the structure of a third conductive layer in an antenna depicted in FIG. 46A. The antenna depicted in FIG. 46A to FIG. 46F differs from the antenna depicted in FIG. 41A to FIG. 41F in that the radiating plate RP includes a plurality of radiating blocks BK.

FIG. 47A is a cross-sectional view along a P-P' line in FIG. 46A. FIG. 47B illustrates included angles between a longitudinal direction of a slot and extension directions of slits in some embodiments according to the present disclosure. FIG. 47C illustrates an overall shape of a radiating plate of the antenna depicted in FIG. 46A.

In some embodiments, the plurality of radiating blocks BK are spaced apart by a plurality of first slits SL1 and a plurality of second slits SL2. A respective one of the plurality of first slits SL1 extend substantially along a first direction DR1. A respective one of the plurality of second slits SL2 extend substantially along a second direction SR2, the second direction DR2 being different from the first direction DR1. In some embodiments, as shown in FIG. 47B, the first included angle $\alpha 1$ is in a range of 35 degrees to 55 degrees (e.g., 35 degrees to 40 degrees, 40 degrees to 45 degrees, 45 degrees to 50 degrees, or 50 degrees to 55 degrees,); and the second included angle $\alpha 2$ is in a range of 125 degrees to 145 degrees (e.g., 125 degrees to 130 degrees, 130 degrees to 135 degrees, 135 degrees to 140 degrees, or 140 degrees to 145 degrees). In one example, the first included angle $\alpha 1$ is 45 degrees, and the second included angle $\alpha 2$ is 135 degrees.

In some embodiments, as shown in FIG. 46A to FIG. 46F, FIG. 47B, and FIG. 47C, the radiating plate RP has an overall polygonal shape (e.g., a cross shape) having first sides S1 extending along the first direction DR1 and second sides S2 extending along a second direction DR2. The longitudinal direction LDR of the slot ST has a first included angle $\alpha 1$ with respect to the first direction DR1, and a second included angle $\alpha 2$ with respect to the second direction DR2. In particular, the inventors of the present disclosure discover that an improved antenna bandwidth and gain can be achieved when the first included angle α1 is in a range of 35 degrees to 55 degrees (e.g., 35 degrees to 40 degrees, 40 degrees to 45 degrees, 45 degrees to 50 degrees, or 50 degrees to 55 degrees,); and the second included angle α2 is in a range of 125 degrees to 145 degrees (e.g., 125 degrees to 130 degrees, 130 degrees to 135 degrees, 135 degrees to 140 degrees, or 140 degrees to 145 degrees). In one example, the first included angle α1 is 45 degrees, and the second included angle α2 is 135 degrees.

FIG. 48A illustrates an S11 graph of the antenna depicted in FIG. 46A. FIG. 48B illustrates a realized gain curve of the antenna depicted in FIG. 46A at a central frequency point. FIG. 48C illustrates a realized gain curve of the antenna depicted in FIG. 46A in a frequency range of 24 GHz to 30 GHz.

Referring to FIG. 48A, the antenna has a −10 dB impedance bandwidth of 8.47 GHz (ranging from 22 GHz to 30.47 GHz), with a relative bandwidth of 32.2%. Referring to FIG. 48B, the gain at the central frequency point (28 GHz) is 9.50 dBi. Referring to FIG. 48C, in the frequency range of 24 GHz to 30 GHz, a minimum value of gain is 8.30 dBi at a frequency point 24 GHz, and a maximum value of gain is 9.85 dBi at a frequency point 29 GHz. A variation range of the gain values is 1.55 dB. As compared to the antenna depicted in FIG. 28A, the relative impedance bandwidth of the antenna depicted in FIG. 48A decreases; the gain at the central frequency point increases; but the variation range of the gain values increases slightly.

As compared to the antenna depicted in FIG. 43A, the relative impedance bandwidth of the antenna depicted in FIG. 46A decreases; but the gain at the central frequency point increases slightly; and the variation range of the gain values decreases significantly. Comparing the antenna depicted in FIG. 46A with the antenna depicted in FIG. 43A, by having the included angles between extension directions of the slits and the longitudinal direction of the slot in certain ranges (e.g., 45 degrees and 135 degrees), and by having the included angles between the longitudinal direction of a slot and extension directions of first sides and second sides of the overall shape of the radiating plate in certain ranges (e.g., 45 degrees and 135 degrees), the performance of the antenna can be improved As compared to the antenna depicted in FIG. 40A, the relative impedance bandwidth of the antenna depicted in FIG. 46A increases significantly; the gain at the central frequency point increases significantly; and the variation range of the gain values decreases significantly. By dividing the radiating plate into a plurality of radiating blocks, the performance of the antenna can be significantly improved without the need for an additional feed network to improve the antenna gain.

FIG. 49 illustrates an antenna array comprising a plurality of antenna described in the present disclosure. Referring to FIG. 49, the antenna array is a ±45° polarized 1*4 MIMO antenna array, which can be used in 5G millimeter wave mobile communication due to its advantages such as ultra-broadband low-profile high-gain miniaturization.

In another aspect, the present disclosure provide an electronic apparatus. In some embodiments, the electronic apparatus includes an antenna described herein, and one or more circuits. In one example, the electronic apparatus is a communication apparatus. In some embodiments, the communication apparatus includes the antenna described herein, a signal circuit, and a controller.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An antenna, comprising a microstrip feed line, a ground plate, a slot extending through the ground plate, and a radiating plate;
- wherein the radiating plate is on a side of the ground plate and the slot away from the microstrip feed line;
- the radiating plate is configured to receive a signal from the microstrip feed line by aperture coupling through the slot; and
- the radiating plate comprises a plurality of radiating blocks spaced apart from each other;
- wherein the plurality of radiating blocks are spaced apart by a plurality of first slits and a plurality of second slits;
- a respective one of the plurality of first slits extend substantially along a first direction; and
- a respective one of the plurality of second slits extend substantially along a second direction, the second direction being different from the first direction.

2. The antenna of claim 1, wherein the slot has a longitudinal shape, a longitudinal direction of the slot has a first included angle with respect to the first direction, and a second included angle with respect to the second direction.

3. The antenna of claim 2, wherein the first included angle is in a range of 40 degrees to 50 degrees; and
- the second included angle is in a range of 130 degrees to 140 degrees.

4. The antenna of claim 2, wherein the first included angle is in a range of −5 degrees to 5 degrees; and
- the second included angle is in a range of 85 degrees to 95 degrees.

5. The antenna of claim 1, wherein the plurality of first slits are equispaced, and the plurality of second slits are equispaced.

6. The antenna of claim 1, wherein inter-slit distances of the plurality of first slits are substantially the same as inter-slit distances of the plurality of second slits.

7. The antenna of claim 1, wherein inter-slit distances of the plurality of first slits are different from inter-slit distances of the plurality of second slits.

8. The antenna of claim 1, wherein a combination of the plurality of radiating blocks has an overall circular shape.

9. The antenna of claim 1, wherein a combination of the plurality of radiating blocks has an overall rectangular or square shape.

10. The antenna of claim 1, wherein a combination of the plurality of radiating blocks has an overall cross shape.

11. An antenna, comprising a microstrip feed line, a ground plate, a slot extending through the ground plate, and a radiating plate;

wherein the radiating plate is on a side of the ground plate and the slot away from the microstrip feed line;

the radiating plate is configured to receive a signal from the microstrip feed line by aperture coupling through the slot; and the radiating plate comprises a plurality of radiating blocks spaced apart from each other;

wherein the antenna further comprises:

a first conductive layer;

a first dielectric layer on the first conductive layer;

a second conductive layer on a side of the first dielectric layer away from the first conductive layer;

a second dielectric layer on a side of the second conductive layer away from the first dielectric layer; and a third conductive layer on a side of the second dielectric layer away from the second conductive layer.

12. The antenna of claim 11, wherein the first conductive layer comprises the microstrip feed line;

the second conductive layer comprises the ground plate; and the third conductive layer comprises the radiating plate.

13. The antenna of claim 1, wherein an orthographic projection of the ground plate on the first dielectric layer covers an orthographic projection of the radiating plate on the first dielectric layer except for in a region corresponding to the slot.

14. The antenna of claim 1, wherein an orthographic projection of the microstrip feed line on the first dielectric layer at least partially overlaps with an orthographic projection of the slot on the first dielectric layer.

15. An electronic apparatus, comprising the antenna of claim 1.

* * * * *